US007063429B2

(12) United States Patent
Hirano et al.

(10) Patent No.: US 7,063,429 B2
(45) Date of Patent: Jun. 20, 2006

(54) LIGHT-EMITTING DISPLAY DEVICE USING LIGHT-EMITTING ELEMENT AND ELECTRONIC APPARATUS

(75) Inventors: Tadao Hirano, Akiruno (JP); Masato Ueno, Hachioji (JP); Shinichi Tanaka, Hidaka (JP)

(73) Assignee: Casio Computer Co., Ltd., Tokyo (JP)

( * ) Notice: Subject to any disclaimer, the term of this patent is extended or adjusted under 35 U.S.C. 154(b) by 381 days.

(21) Appl. No.: 10/303,547

(22) Filed: Nov. 25, 2002

(65) Prior Publication Data

US 2003/0103418 A1 Jun. 5, 2003

(30) Foreign Application Priority Data

Dec. 4, 2001 (JP) ............................ 2001-370284
May 30, 2002 (JP) ............................ 2002-157211

(51) Int. Cl.
*G01D 11/28* (2006.01)

(52) U.S. Cl. ............................ 362/26; 362/27; 362/30; 362/103; 362/235; 362/570

(58) Field of Classification Search ............ 362/23–31, 362/240, 103, 104, 235, 570, 571
See application file for complete search history.

(56) References Cited

U.S. PATENT DOCUMENTS 2,128,246 A * 8/1938 Hardesty ..................... 40/546
2,454,280 A * 11/1948 Hardesty .................... 359/437
3,262,224 A * 7/1966 Hardesty ..................... 40/546
3,491,245 A * 1/1970 Hardesty ............... 250/227.11
3,726,250 A * 4/1973 Merk .......................... 345/34
3,748,456 A * 7/1973 Brien .......................... 362/26
4,115,994 A * 9/1978 Tomlinson .................. 368/241
4,217,625 A * 8/1980 Klein .......................... 362/30
4,250,575 A * 2/1981 Flumm ....................... 368/227
4,460,940 A * 7/1984 Mori .......................... 362/558
4,561,042 A * 12/1985 Wehner et al. ................ 362/30
4,705,407 A 11/1987 Brien
4,775,964 A * 10/1988 Alessio et al. ................ 368/67
4,908,739 A * 3/1990 Brien .......................... 362/23
4,975,809 A * 12/1990 Ku ............................. 362/31
5,084,698 A * 1/1992 Sell ............................. 345/83
5,604,716 A 2/1997 Cheung
5,949,346 A * 9/1999 Suzuki et al. .......... 340/815.45
5,984,485 A * 11/1999 Poli et al. ...................... 362/26
6,106,127 A * 8/2000 Fuwausa ...................... 362/29
6,195,196 B1 * 2/2001 Kimura et al. .............. 359/295
6,299,338 B1 * 10/2001 Levinson et al. ........... 362/559
6,487,143 B1 * 11/2002 Kaelin ........................ 368/227

FOREIGN PATENT DOCUMENTS

| | | | |
|---|---|---|---|
| CN | 1147876 | A | 4/1997 |
| CN | 1166211 | A | 11/1997 |
| JP | 8-160171 | A | 6/1996 |
| JP | 2001-99952 | A | 4/2001 |
| JP | 2001-141846 | A | 5/2001 |

* cited by examiner

*Primary Examiner*—Sandra O'Shea
*Assistant Examiner*—Jason Han
(74) *Attorney, Agent, or Firm*—Frishauf, Holtz, Goodman & Chick, P.C.

(57) ABSTRACT

An electronic apparatus has a light-emitting element and a light-emitting portion. An output light from the light-emitting element is guided by a frame-like member having serrations and radiated toward the light-emitting portion. This causes the light-emitting portion to emit light reliably, and improves the decorativeness of the apparatus.

12 Claims, 29 Drawing Sheets

27

LIGHT-EMITTING DISPLAY DEVICE USING LIGHT-EMITTING ELEMENT AND ELECTRONIC APPARATUS

CROSS-REFERENCE TO RELATED APPLICATIONS

This application is based upon and claims the benefit of priority from the prior Japanese Patent Applications No. 2001-370284, filed Dec. 4, 2001; and No. 2002-157211, filed May 30, 2002, the entire contents of both of which are incorporated herein by reference.

BACKGROUND OF THE INVENTION

1. Field of the Invention

The present invention relates to a light-emitting display device used in various apparatuses such as wristwatches, cell phones, and automobile meters, and an electronic apparatus.

2. Description of the Related Art

Some conventional electronic apparatuses, e.g., wristwatches have a light storage portion formed by partially coating a watch part such as a dial or hand with a light storage paint, such as a luminous paint, by printing or the like. This light storage portion stores energy from external light in a bright place and emits light by the stored energy in a dark place.

In a dark place, the light storage portion of this wristwatch can emit light to inform the time and the like. However, this light storage portion cannot freely emit light whenever the user desires, and its emission luminance is also insufficient. Furthermore, since only the light storage portion emits light, no satisfactory decorating effect can be obtained.

BRIEF SUMMARY OF THE INVENTION

It is an object of the present invention to provide an elemental technology capable of allowing a light-emitting portion to emit light by irradiating this light-emitting portion effectively and reliably with output light from a light-emitting element, and to provide a highly decorative light-emitting display device and electronic apparatus.

To achieve the above object, the present invention comprises a light-emitting element provided in a light-transmitting, frame-like member, and a light-emitting portion which emits colored light in response to output light from the light-emitting element, wherein output light from the light-emitting element is diverged or converged by the frame-like member and radiated from a light-radiating portion toward the light-emitting portion.

Another invention comprises a light-emitting element, and a light-emitting portion which emits colored light in response to output light from the light-emitting element, wherein output light from the light-emitting element is separated and guided by a plurality of light guide portions and radiated toward the light-emitting portion from the end portion of each light guide portion.

Still another invention comprises a light-emitting element provided in a light-transmitting, frame-like member, and a light-emitting portion which emits colored light in response to output light from the light-emitting element, wherein the amount of photoreactive light-emitting particles in the light-emitting portion changes in accordance with the distance from the light-emitting element.

Still another invention comprises a light-emitting element provided in a light-transmitting, frame-like member, a light-emitting portion which emits colored light in response to output light from the light-emitting element, and a light-shielding member which shields light radiated toward the light-emitting portion, wherein the light-shielding area of the light-shielding member changes in accordance with the distance from the light-emitting element.

BRIEF DESCRIPTION OF THE SEVERAL VIEWS OF THE DRAWING

FIGS. 3A to 3C are views showing an ultraviolet light-emitting element according to the present invention, in which FIG. 3A is a front view, FIG. 3B is a bottom view, and FIG. 3C is a side view;

FIGS. 32A to 32C are enlarged views of a light-exit portion of the light guide member according to the present invention, in which FIG. 32A shows a planar light-exit portion, FIG. 32B shows a concave light-exit portion, and FIG. 32C shows a convex light-exit portion;

DETAILED DESCRIPTION OF THE INVENTION

Embodiments in which the present invention is applied to a wristwatch will be described in detail below with reference to the accompanying drawing.

(1) FIRST EMBODIMENT

Figure 1:
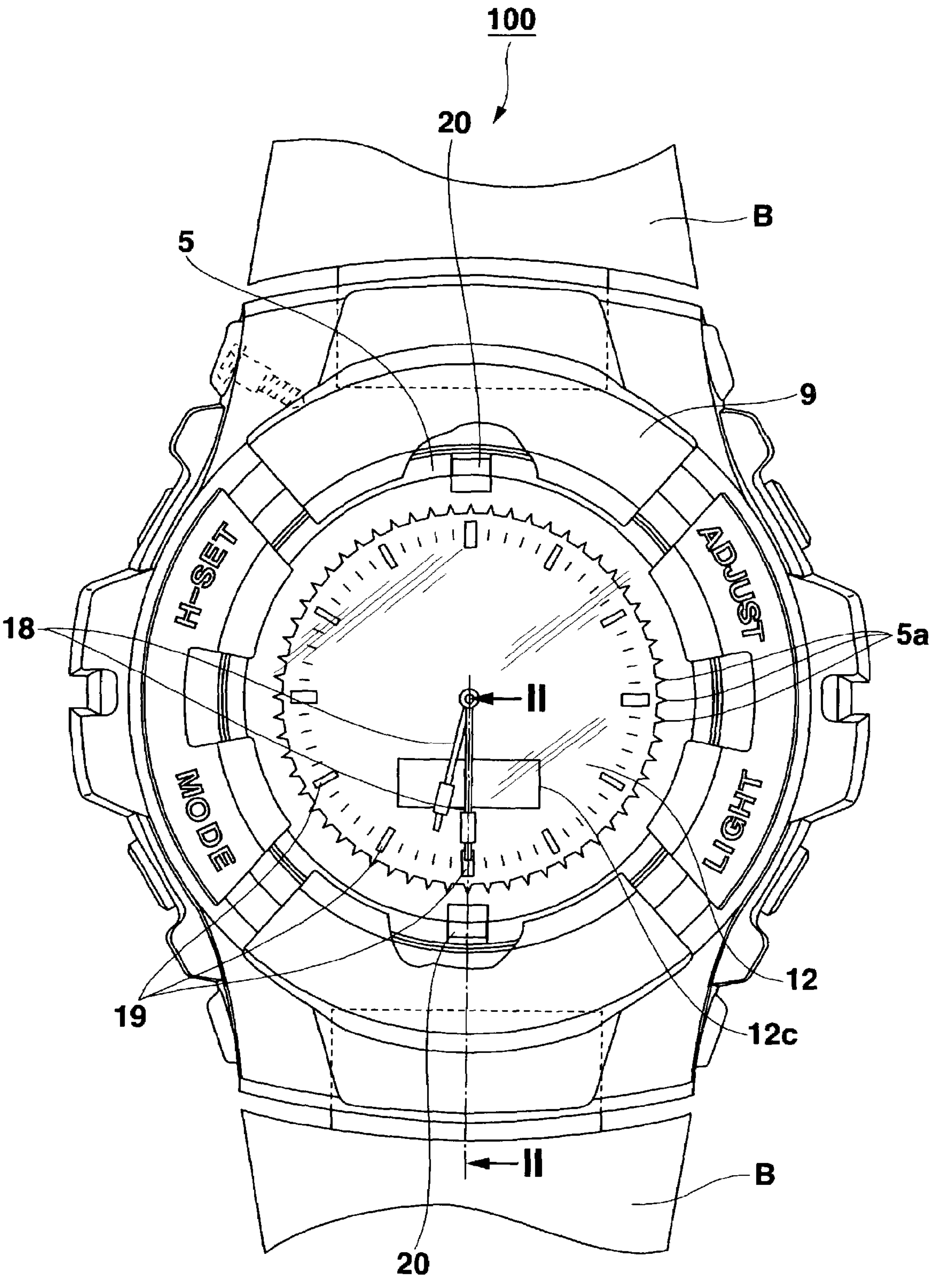
FIG. 1 is a partially omitted plan view showing the first embodiment of a wristwatch to which the present invention is applied.
Figure 2:
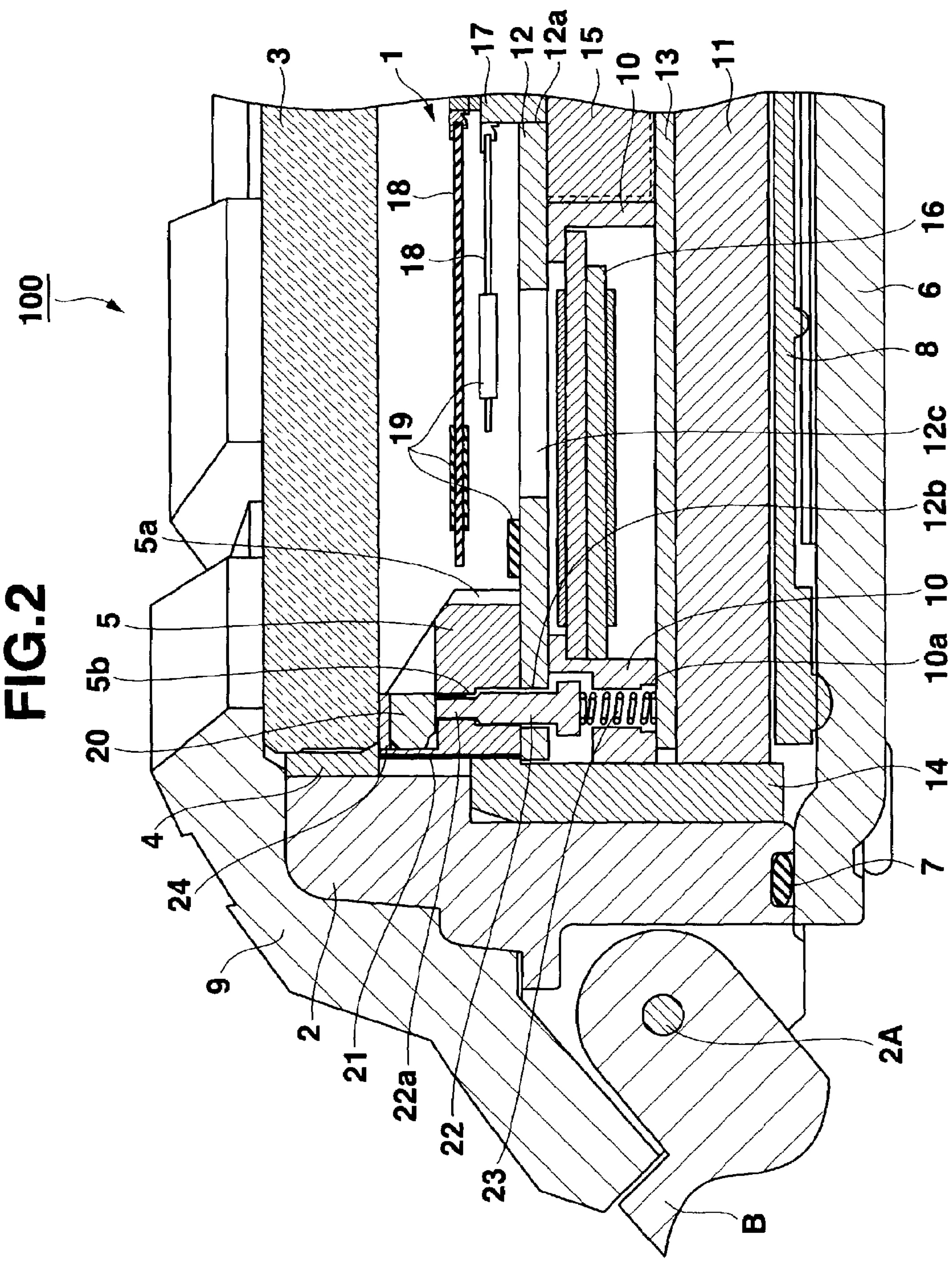
FIG. 2 is an enlarged sectional view of the main parts of the wristwatch taken along a line II—II in FIG. 1.

FIG. 1 is a plan view showing a wristwatch of the present invention. FIG. 2 is an enlarged sectional view of the main parts taken along a line II—II in FIG. 1.

As shown in FIGS. 1 and 2, this wristwatch 100 has a watch case 2 as an apparatus case for accommodating a watch module 1 as a light-emitting display device. Watch glass 3 is attached to the upper central portion of this watch case 2 via a packing 4. A frame-like member 5 of the watch module 1 is positioned such that the upper portion of this frame-like member 5 comes in contact with the watch glass 3. A rear cover 6 is attached to the lower surface of the watch case 2 via a waterproof ring 7. A cushioning member 8 is inserted between the watch module 1 and the rear cover 6. A bezel 9 is formed on the upper outer circumferential surface of the watch case 2. Furthermore, a watchband B is attached to the watch case 2 via band shafts 2A.

The watch module 1 has at least one of an analog function and digital function. FIG. 2 shows the watch module 1 having both of these functions. As shown in FIG. 2, this watch module 1 has an upper housing 10 and lower housing 11. A dial 12 is placed on the upper surface of the upper housing 10, and the frame-like member 5 is placed on the upper surface of this dial 12. Also, a circuit board 13 is inserted between the upper housing 10 and lower housing 11. The watch module 1 has a structure in which these dial 12, upper housing 10, circuit board 13, and lower housing 11 are fixed to a middle frame 14.

The upper housing 10 also includes an analog hand mechanism 15 and liquid crystal display 16. A battery (not shown) for operating these analog hand mechanism 15 and liquid crystal display 16 is incorporated into the lower housing 11.

The analog hand mechanism 15 is made up of a hand shaft 17 extending upward from a shaft hole 12*a* formed in the dial 12, and hands 18 such as an hour hand and minute hand attached to the hand shaft 17. These hands 18 move above the dial 12. Light-emitting portions 19 which emit colored light in response to output light from light-emitting elements are formed in predetermined portions of the dial 12 and hands 18.

The liquid crystal display 16 is formed by arranging upper and lower polarizing plates on the upper and lower surfaces, respectively, of a liquid crystal cell in which a liquid crystal is sealed between a pair of upper and lower transparent electrode substrates. This liquid crystal display 16 displays information such as time in accordance with the state in which a voltage is applied between the pair of electrode substrates of the liquid crystal cell. The liquid crystal display 16 can be seen through a window 12*c* formed in the dial 12.

The frame-like member 5 is made of, e.g., a light-transmitting synthetic resin, particularly a transparent synthetic resin. As shown in FIG. 2, this frame-like member 5 is fitted on the inner circumferential surface of the watch case 2 such that the frame-like member 5 is in contact with the lower surface of the edge of the watch glass 3 and with the upper surface of the edge of the dial 12 (upper housing 10). That is, this frame-like member 5 also functions as a protecting member or cushioning member.

Serrations 5*a* as light-radiating portions are formed throughout the entire inner circumferential surface of the frame-like member 5. These serrations 5*a* diverge light entering the frame-like member 5 by diffused reflection, thereby radiating the light toward the inside of this frame-like member 5.

In addition, ultraviolet light-emitting elements 20 called black lights are formed in predetermined portions, e.g., portions corresponding to 12 and 6 o'clock as shown in FIG. 1, of the frame-like member 5. This ultraviolet light-emitting element 20 is an ultraviolet lamp or ultraviolet light-emitting diode (LED) which emits ultraviolet rays having a wavelength of 254 to 420 nm (nanometers) or 374 to 389 nm, preferably, about 365 nm.

Figure 3A:
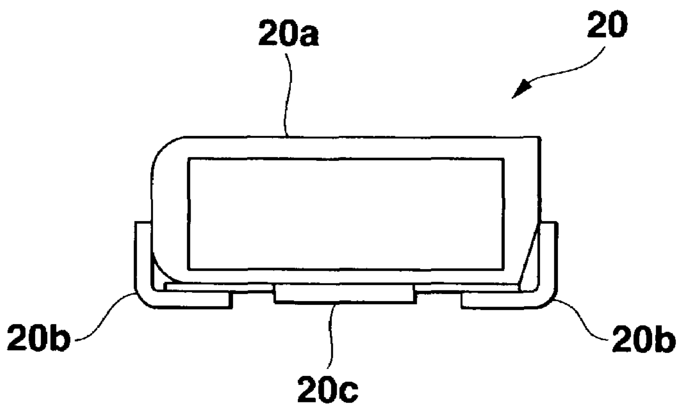
Figure 3B:
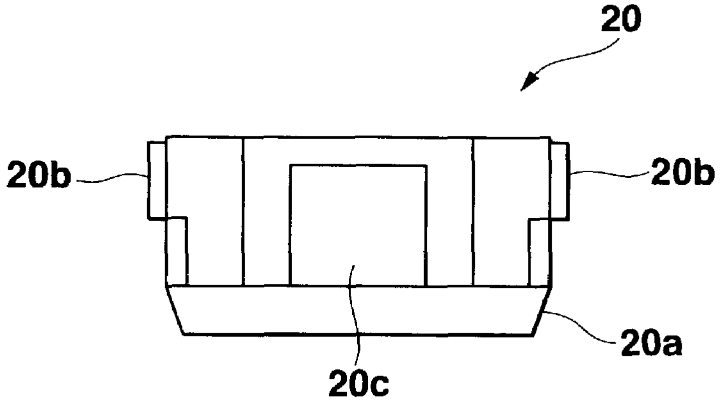
Figure 3C:
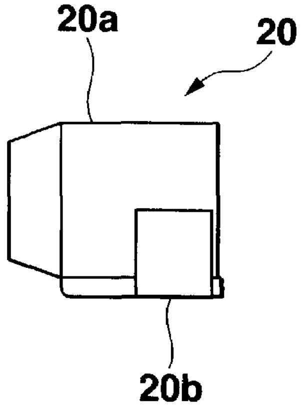

As shown in FIGS. 3A to 3C, this ultraviolet light-emitting element 20 is made of, e.g., a light output portion 20*a*, electrode terminal 20*b*, and cushioning material 20*c*. The electrode terminal 20*b* is formed on the bottom surface of the light output portion 20*a* so as to partially extend to the side surfaces of this light output portion 20*a*. The cushioning material 20*c* is provided in substantially the center of the bottom surface of the light output portion 20*a*.

Figure 4:
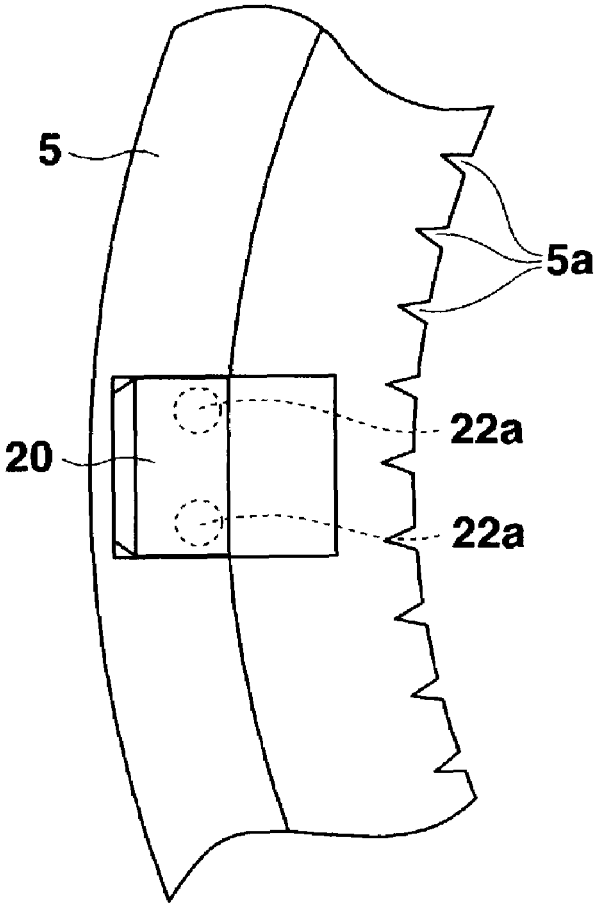
FIG. 4 is an enlarged view of the major components of a frame-like member in which the ultraviolet light-emitting element according to the present invention is provided.

Also, as shown in FIGS. 2 and 4, this ultraviolet light-emitting element 20 is embedded in the frame-like member 5. Output ultraviolet rays from the ultraviolet light-emitting element 20 enter the frame-like member 5 having light transmitting properties, and are fed into and guided by this frame-like member 5. The guided ultraviolet rays are diverged and output by diffused reflection from the serrations 5*a* formed on the inner circumferential surface of the frame-like member 5. A reflecting portion 21 which is a paint or resin material having a color, e.g., silver or white, which reflects light well, is formed on the inner wall of the watch case 2 in contact with the frame-like member 5. Therefore, the light fed into and guided by the frame-like member 5 is reflected by the inner circumferential surface of this frame-like member 5 and efficiently output from the serrations 5*a*.

As described above, even in a portion separated from the ultraviolet light-emitting portion 20, ultraviolet rays guided by the frame-like member 5 are output from the serrations 5*a*. Hence, the light-emitting portion 19 can receive the ultraviolet rays. Also, since the ultraviolet light-emitting elements 20 are diagonally formed in the portions corresponding to 12 and 6 o'clock, ultraviolet rays are efficiently radiated.

Figure 5:
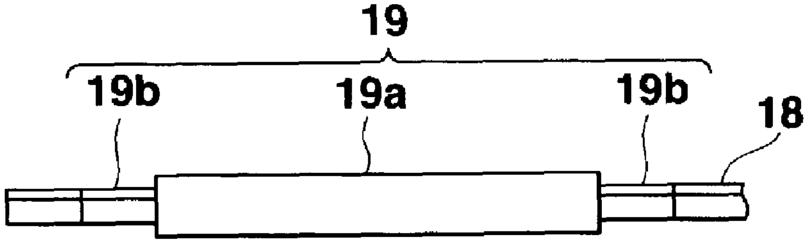
FIG. 5 is an enlarged view of a hand shown in FIG. 2.
Figure 6:
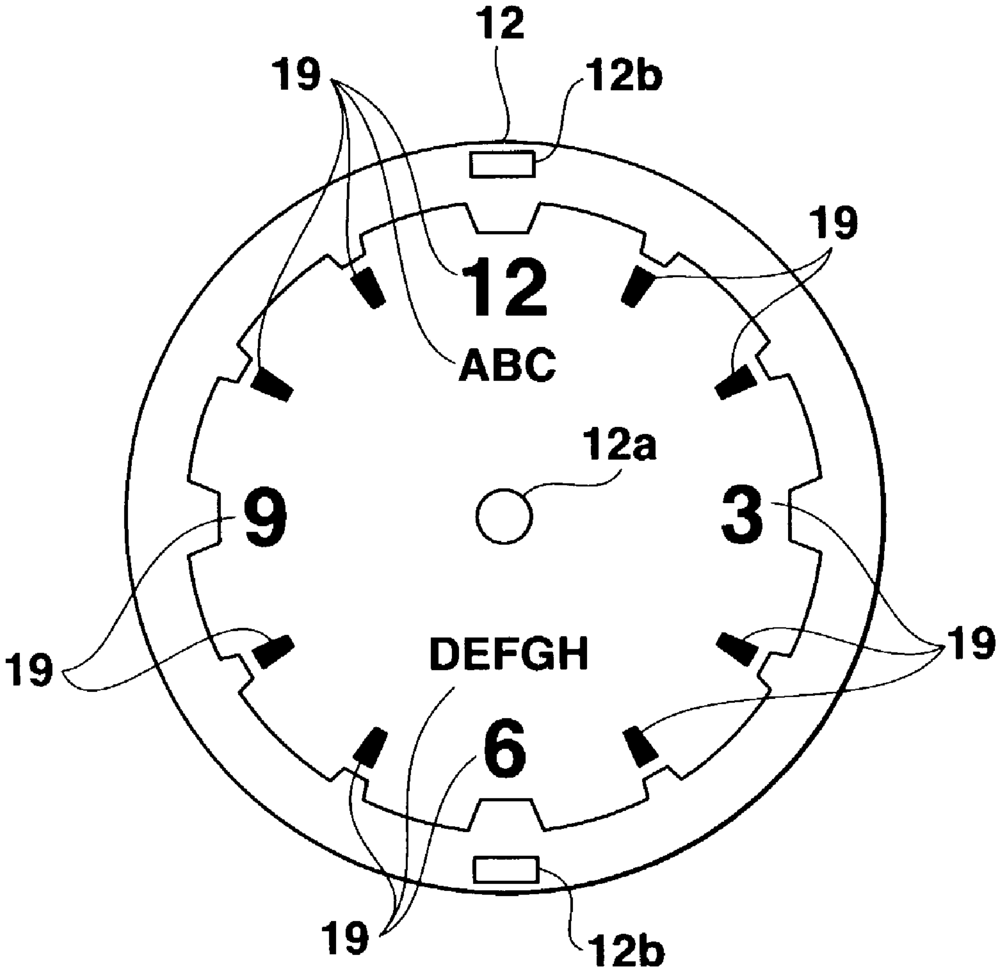
FIG. 6 is a view showing a dial according to the present invention.
Figure 7A:
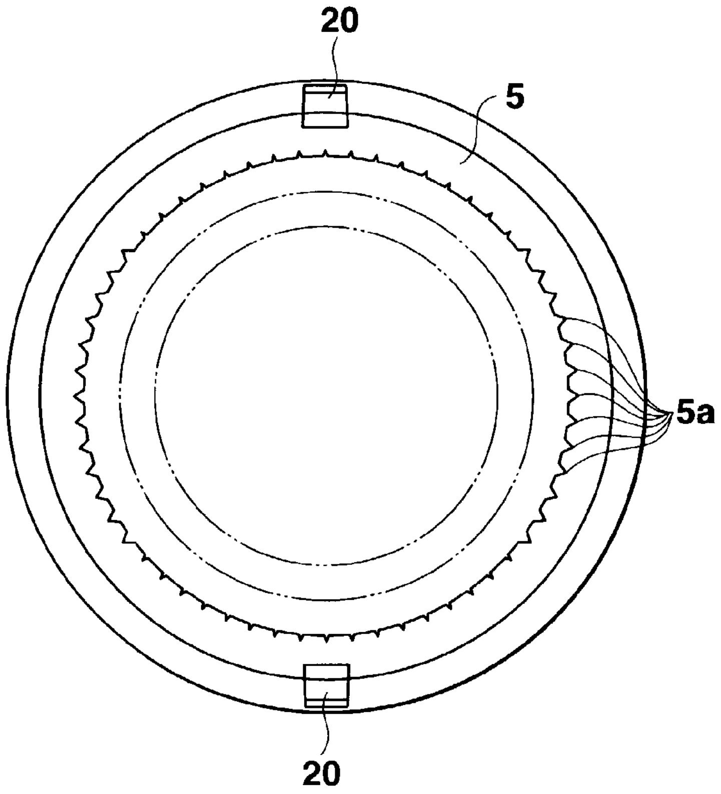
FIG. 7A is a view showing the first modification when serrations of the frame-like member according to the present invention are provided on the inner circumferential surface.
Figure 7B:
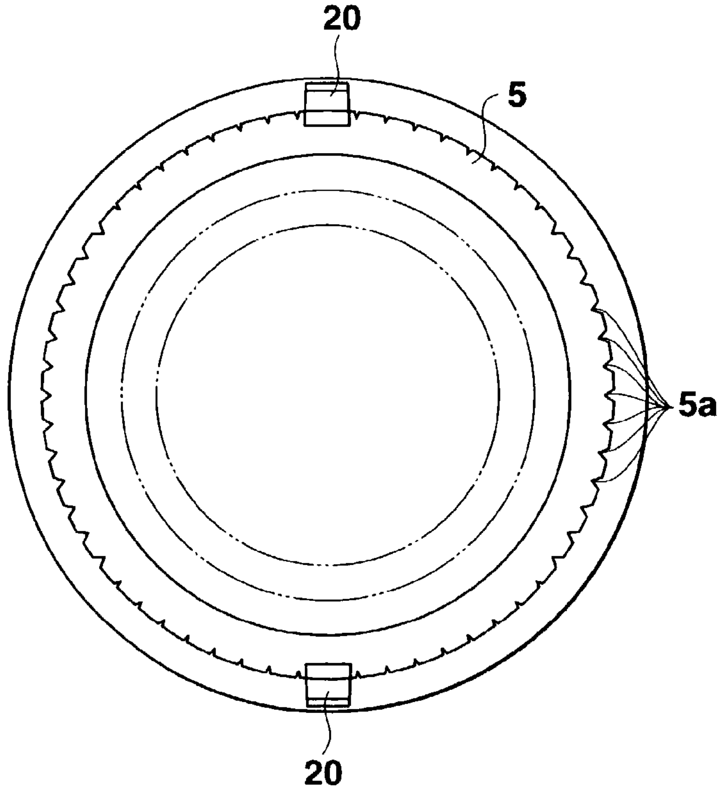
FIG. 7B is a view showing the first modification when serrations of the frame-like member according to the present invention are provided on the outer circumferential surface.

The light-emitting portion 19 is made of, e.g., a phosphor. As shown in FIGS. 2, 5, and 6, a resin buried portion 19*a* as a phosphor and a printed/painted portion 19*b* of this light-emitting portion 19 are formed in a predetermined portion of the dial 12, e.g., on the upper surface of an hour numeral, hour index, or mark, or in a predetermined portion of the hand 18 of the analog hand mechanism 15. The upper surface of the light-emitting portion 19 is preferably covered with and protected by a transparent overcoat (not shown).

These light-emitting portions 19 emit colored light in response to ultraviolet rays having a wavelength of 350 to 420 nm or 254 to 365 nm, and are transparent in a normal state in which no ultraviolet rays are radiated. That is, the light-emitting portions 19 emit colored light in response to output ultraviolet rays from the ultraviolet light-emitting elements 20 or ultraviolet rays output via the light-transmitting, frame-like member 5.

The colors of light emitted by these light-emitting portions 19 are basically three colors, i.e., green (or yellow), blue, and red, and have wide color variations. All these light-emitting portions 19 formed on different watch parts can emit light having the same color. To improve the visibility of the time, however, the colors of light emitted by the light-emitting portions 19 on at least the dial 12 and hands 18 are preferably different from each other. For example, the light-emitting portions 19 on the dial 12 emit red light, and the light-emitting portions 19 on the hands 18 emit blue light. The visibility of the time improves when the colors of light emitted from the dial 12 and hands 18 are thus different from each other. Also, the colors of light emitted from the light-emitting portions 19 on the marks and on the hour numerals can be different, and the color of light can change from one hour numeral to another or from one hour index to another.

In this embodiment, as shown in FIG. 2, the ultraviolet light-emitting element 20 is supported and fixed by a contact member 22 in contact with this ultraviolet light-emitting element 20, and a coil spring 23 which biases the contact member 22. This contact member 22 has a pair of support shafts 22*a* (only one is shown in FIG. 2), and one of these support shafts 22*a* is in contact with the electrode terminal 20*b* of the ultraviolet light-emitting element 20.

The contact member 22 is conductive. This contact member 22 is inserted into a through hole 10*a* formed in the upper housing 10, and is also inserted into a through hole 12*b* formed in the dial 12 and a through hole 5*b* formed in the frame-like member 5, such that the upper end portion of the contact member 22 projects above the frame-like member 5. The ultraviolet light-emitting element 20 is in contact with the projected upper end portion (the pair of support shafts 22*a*). A cushioning member 24 is formed between the light output portion 20*a* of the ultraviolet light-emitting element 20 and the watch glass 3.

The coil spring 23 is also conductive and inserted into the through hole 10*a* formed in the upper housing 10. The lower and upper end portions of this coil spring 23 are in elastic contact with the circuit board 13 and contact member 22, respectively. In this manner, the ultraviolet light-emitting element 20 is elastically supported by the coil spring 23 and electrically connected to the circuit board 13 via the contact member 22 and coil spring 23.

In the wristwatch according to the first embodiment as described above, ultraviolet rays emitted from the ultraviolet light-emitting elements 20 are fed into the light-transmitting, frame-like member 5. The ultraviolet rays are output from the serrations 5*a* formed on the inner circumferential surface of the frame-like member 5 and irradiate the light-emitting portions 19 formed on the individual portions of the watch module 1. Therefore, the user can cause the ultraviolet light-emitting elements 20 to emit light and thereby allow each light-emitting portion 19 to emit colored light whenever he or she desires. Consequently, a colorful and highly decorative wristwatch can be obtained. In addition, the ultraviolet rays emitted from the ultraviolet light-emitting elements 20 can irradiate the light-emitting portions 19 via the serrations 5*a* of the frame-like member 5. Accordingly, even the light-emitting portions 19 separated from these ultraviolet light-emitting elements 20 can emit colored light in a similar way.

In addition, as described above, the reflecting portion 21 which is a paint or resin material having a color, e.g., silver or white, which reflects light well, is formed on the inner wall of the watch case 2 in contact with the frame-like member 5. Hence, the light fed into and guided by the frame-like member 5 can be reflected by the inner circumferential surface of this frame-like member 5 and efficiently output from the serrations 5*a*.

In the above first embodiment, the uniform serrations 5*a* are formed throughout the entire inner circumferential surface of the frame-like member 5. However, the present invention is not limited to this embodiment, and constructions as shown in, e.g., FIGS. 7A, 8A, 9A, and 10A can also be made. In each of FIGS. 7A to 10A, ranges indicated by the dashed lines schematically indicate the ranges of light radiated from the serrations 5*a*.

More specifically, although the serrations 5*a* are formed throughout the entire inner circumferential surface of the frame-like member 5, the sizes of these serrations 5*a* can be changed to form serrations 5*a* having different sizes. For example, in the first modification shown in FIG. 7A, small serrations 5*a* which cause small diffused reflection are formed near the ultraviolet light-emitting elements 20, and large serrations 5*a* which cause large diffused reflection are formed away from the ultraviolet light-emitting elements 20. This balances the ultraviolet intensity in portions where the output ultraviolet rays from the ultraviolet light-emitting elements 20 are originally intense, with the ultraviolet intensity in portions which are separated from the ultraviolet light-emitting elements 20 and in which the ultraviolet rays guided by the frame-like member 5 are weak. Accordingly, the amount of ultraviolet rays output via the frame-like member 5 can be made uniform throughout the entire circumference. This allows the light-emitting portions 19 formed in the watch module 1 to emit light of the same level.

The amount of ultraviolet rays output via the frame-like member 5 can be adjusted by changing the sizes of the serrations 5*a* not only to obtain a uniform amount throughout the entire circumference as described above, but also to increase and decrease the amounts of output ultraviolet rays in desired portions.

Figure 8A:
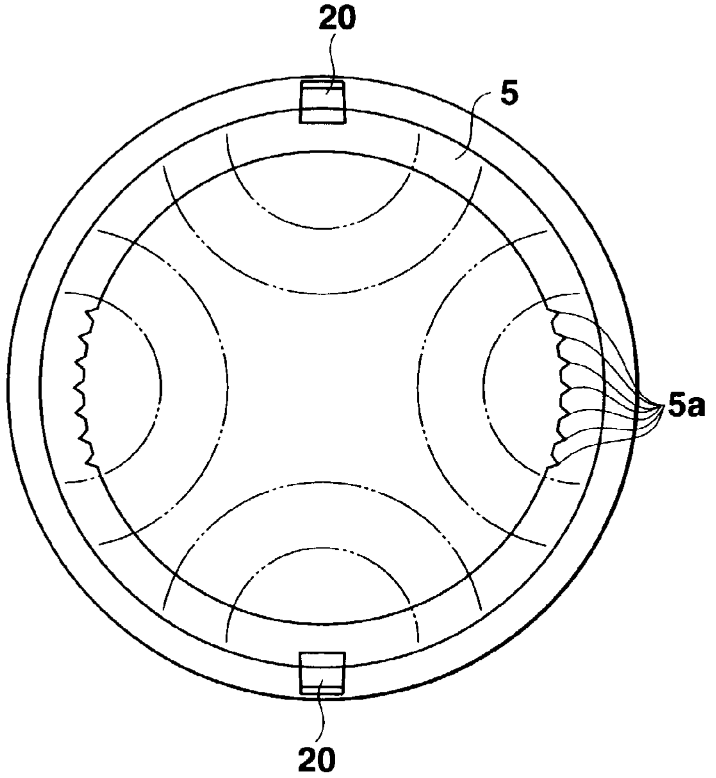
FIG. 8A is a view showing the second modification when serrations of the frame-like member according to the present invention are formed on the inner circumferential surface.
Figure 8B:
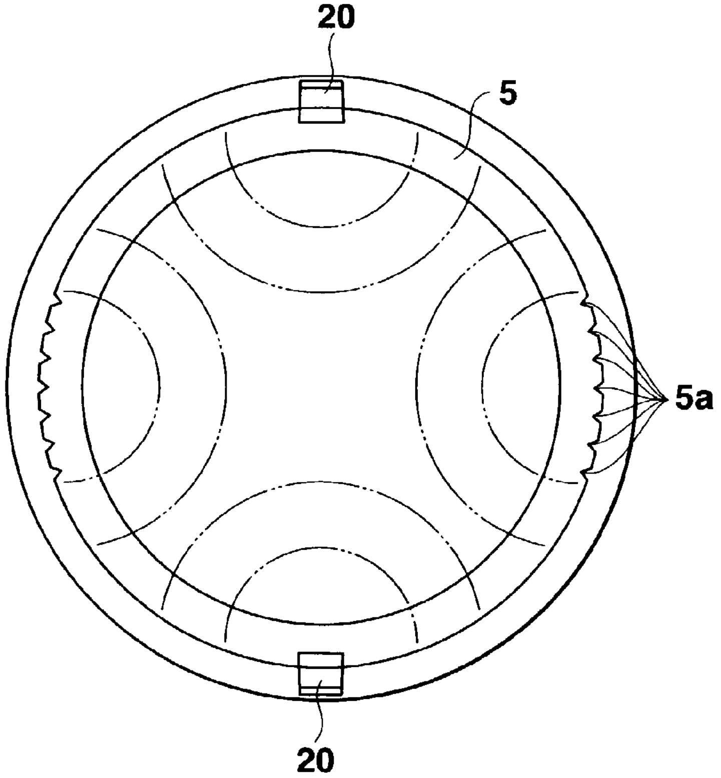
FIG. 8B is a view showing the second modification when serrations of the frame-like member according to the present invention are provided on the outer circumferential surface.
Figure 9A:
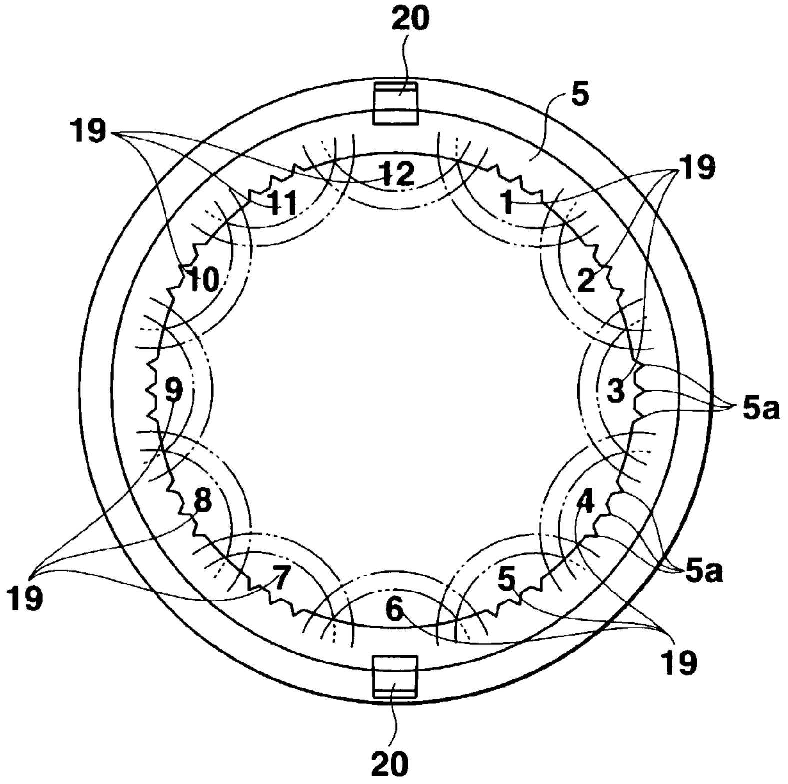
FIG. 9A is a view showing the third modification when serrations of the frame-like member according to the present invention are provided on the inner circumferential surface.
Figure 9B:
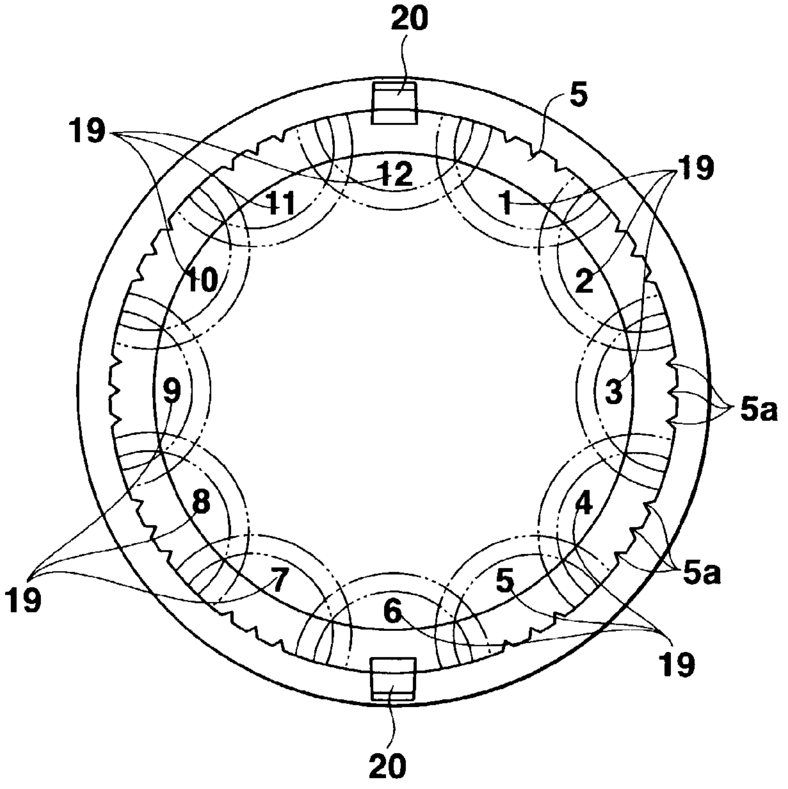
FIG. 9B is a view showing the third modification when serrations of the frame-like member according to the present invention are provided on the outer circumferential surface.

Furthermore, as in the second and third modifications shown in FIGS. 8A and 9A, serrations 5*a* can also be formed only in desired portions of the inner circumferential surface of the frame-like member 5. The amount of ultraviolet rays output by diffused reflection from a portion where the serrations 5*a* are thus formed is larger than that from a portion where no such serrations 5*a* are formed. Accordingly, ultraviolet rays in an amount equal to or larger than that in the vicinity of the ultraviolet light-emitting element 20 are emitted. This makes the light-emitting portions 19 near these serrations 5*a* emit light more intensely.

Especially, when serrations 5*a* are formed in positions corresponding to the hour numerals on the dial 12 as shown in FIG. 9A, the light-emitting portions 19 formed on these hour numerals can emit light more intensely and reliably. This improves the visibility of the time.

Figure 10A:
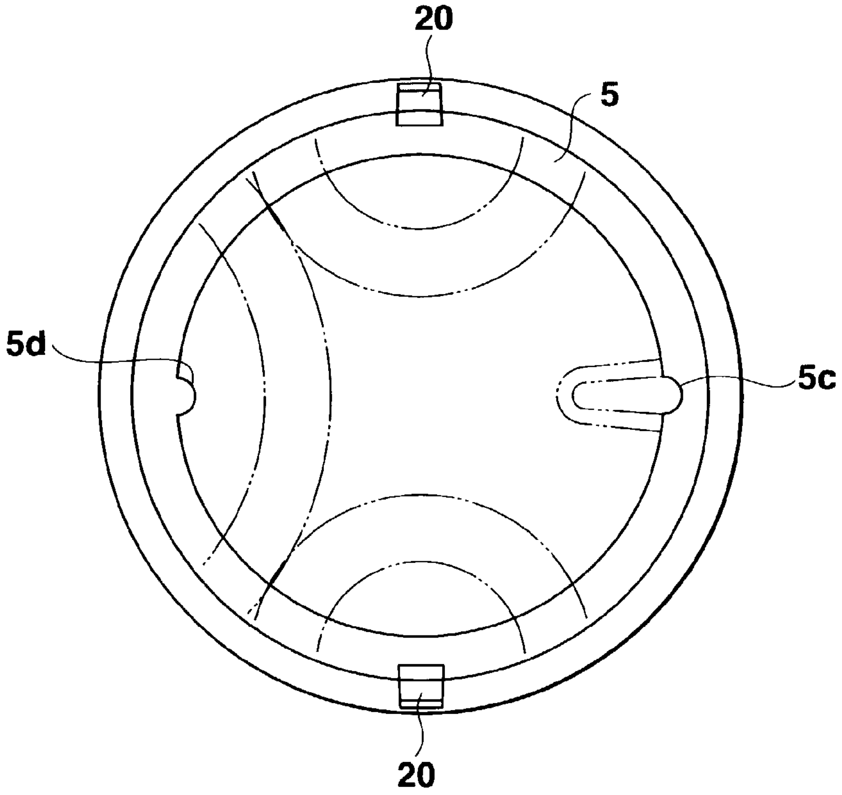
FIG. 10A is a view showing the fourth modification when serrations of the frame-like member according to the present invention are provided on the inner circumferential surface.
Figure 10B:
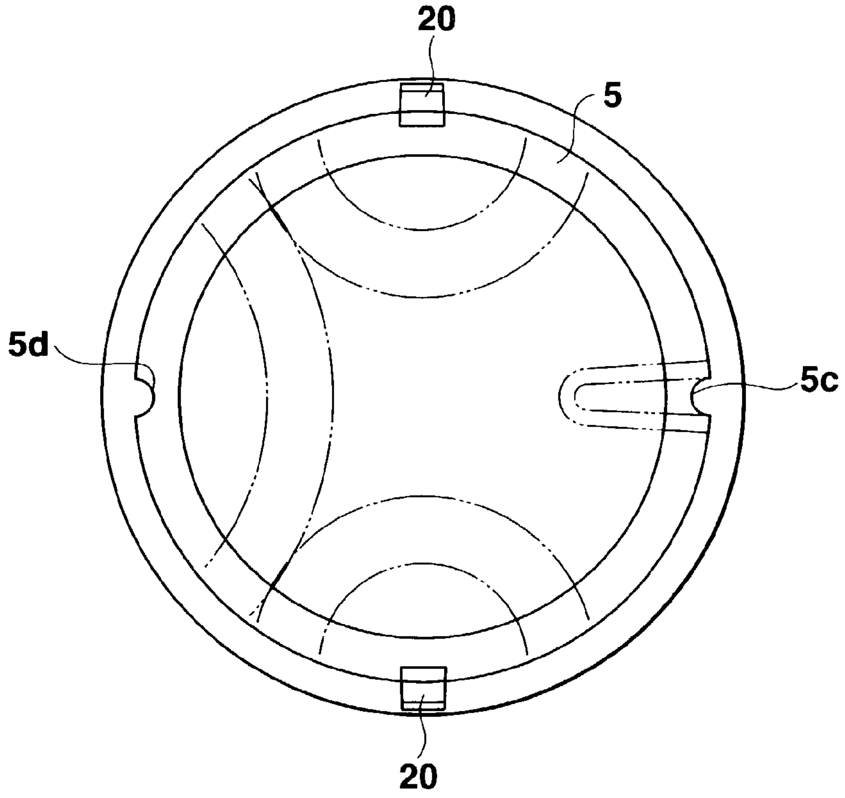
FIG. 10B is a view showing the fourth modification when serrations of the frame-like member according to the present invention are provided on the outer circumferential surface.

Also, as in the fourth modification shown in FIG. 10A, a concave lens 5*c* as a serration 5*a* and a convex lens 5*d* as another serration 5*a* can be formed in desired portions of the inner circumferential surface of the frame-like member 5. That is, lens-like serrations 5*a* can also be formed.

From a portion where the concave lens 5*c* is formed, ultraviolet rays converged by this concave lens 5*c* are output. From a portion where the convex lens 5*d* is formed, ultraviolet rays diverged by this convex lens 5*d* are output. Since, therefore, ultraviolet rays are output from these concave and convex lenses 5*c* and 5*d*, the light-emitting portions 19 formed in these ultraviolet ray output portions can emit light. This makes the wristwatch very decorative and entertaining.

The serrations 5*a* shown in FIGS. 7A, 8A, 9A, and 10A explained above are formed on the inner circumferential surface of the frame-like member 5. However, the present invention is not restricted to these modifications. For example, the serrations 5*a* can also be formed on the outer circumferential surface as shown in FIGS. 7B, 8B, 9B, and 10B. In FIGS. 7B to 10B, only the formation position of the serrations 5*a* is changed from the inner circumferential surface to the outer circumferential surface, and the other arrangements and effects are not particularly. So, a detailed explanation of these modifications will be omitted.

Also, the ultraviolet light-emitting elements 20 are formed above the frame-like member 5 in the first embodiment described above. However, arrangements as shown in FIGS. 11, 12, 13, and 14 can also be made.

(2) SECOND EMBODIMENT

Figure 11:
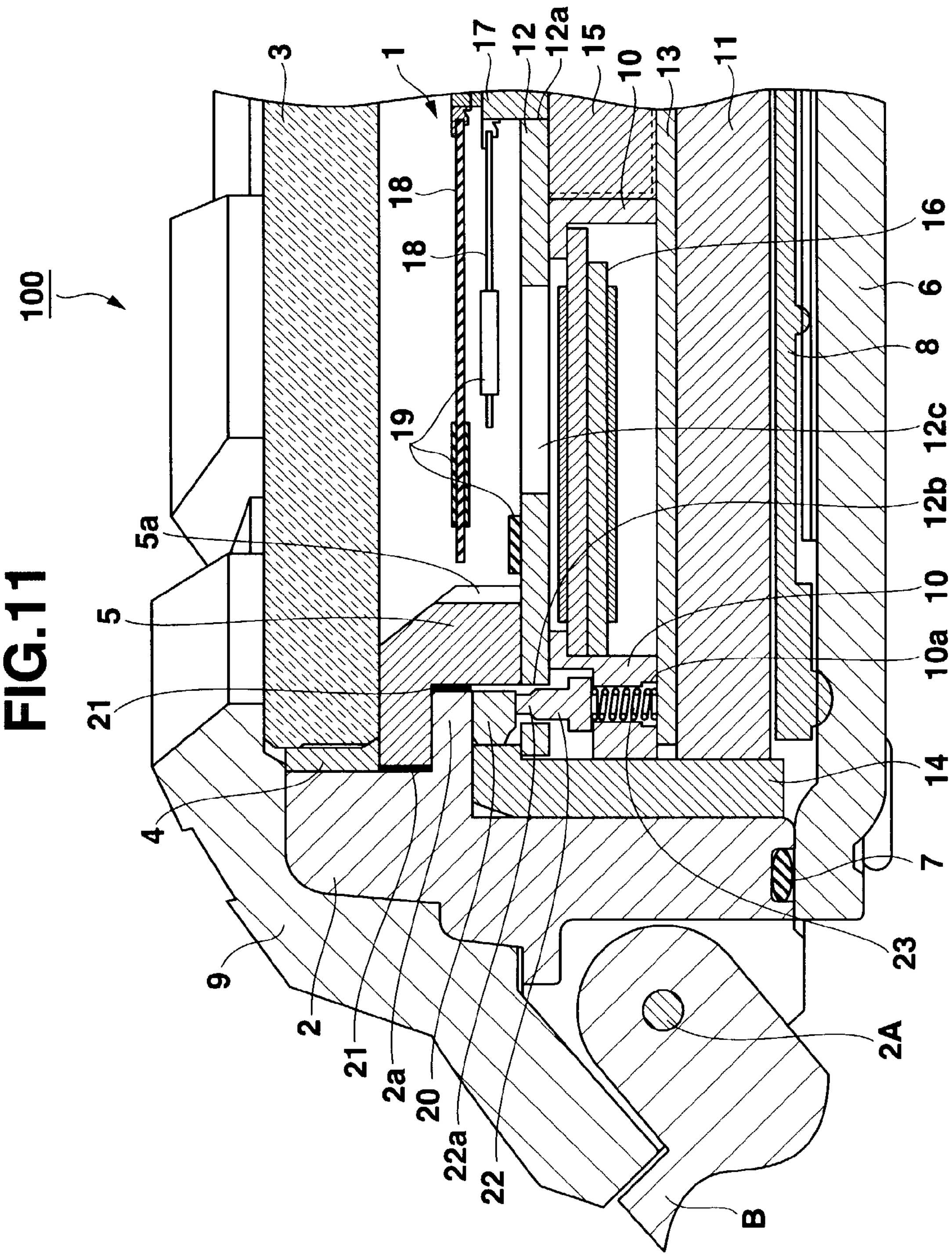
FIG. 11 is an enlarged sectional view of the main parts of a wristwatch showing the second embodiment according to the present invention.

As in the second embodiment shown in FIG. 11, a projection 2*a* which projects from the inner circumferential surface of a watch case 2 can be formed away from a dial 12, and an ultraviolet light-emitting element 20 can be formed between the lower surface of this projection 2*a* and the upper surface of the dial 12 and below the outer circumferential surface of a frame-like member 5. Even with this structure, the same functions and effects as the structure shown in FIG. 2 can be obtained.

(3) THIRD EMBODIMENT

Figure 12:
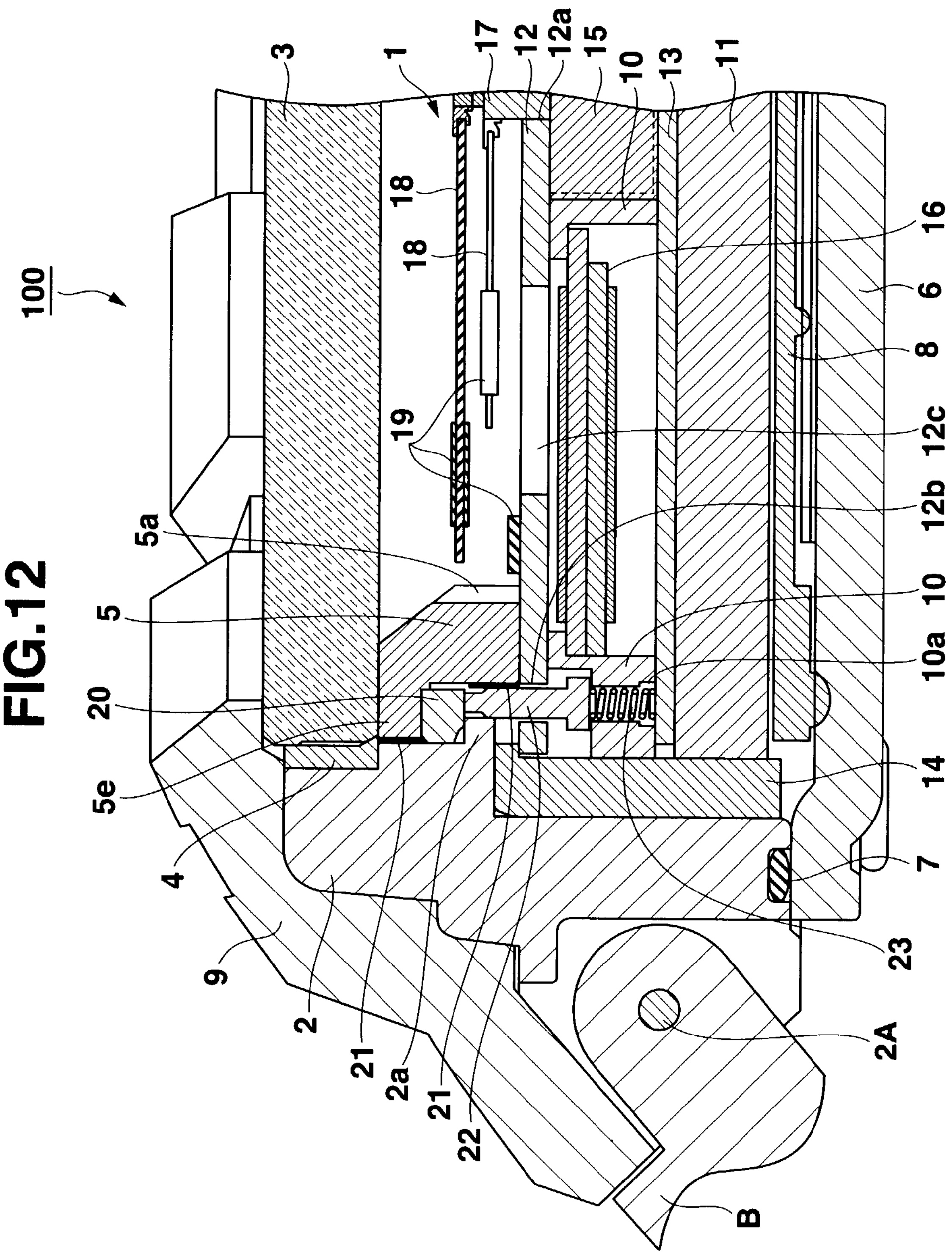
FIG. 12 is an enlarged sectional view of the main parts of a wristwatch showing the third embodiment according to the present invention.

As in the third embodiment shown in FIG. 12, it is also possible to form a projection 2*a* which projects from the inner circumferential surface of a watch case 2, and form an ultraviolet light-emitting element 20 between the upper surface of this projection 2*a* and the lower surface of a projection 5*e* which projects outward from the upper portion of a frame-like member 5 and on the outer circumferential surface of this frame-like member 5. With this structure also, the same functions and effects as the structure shown in FIG. 2 can be obtained.

(4) FOURTH EMBODIMENT

Figure 13:
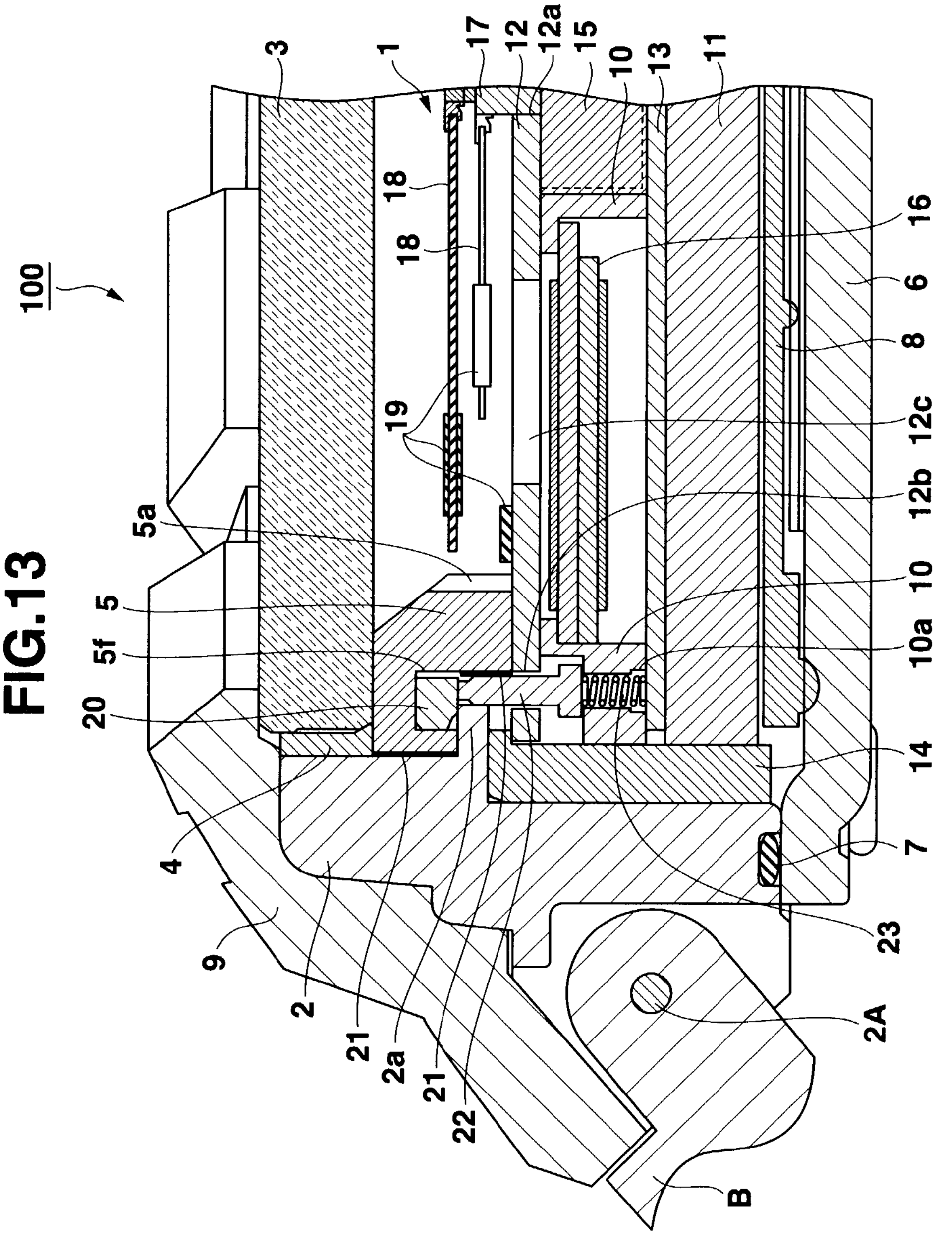
FIG. 13 is an enlarged sectional view of the main parts of a wristwatch showing the fourth embodiment according to the present invention.

As in the fourth embodiment shown in FIG. 13, it is also possible to form a mounting hole 5*f* in the lower surface of a frame-like member 5 and insert an ultraviolet light-emitting element 20 into this mounting hole 5*f* such that the light emission surface faces the inner circumferential surface of the frame-like member 5. With this structure also, the same functions and effects as the structure shown in FIG. 2 can be obtained.

(5) FIFTH EMBODIMENT

Figure 14:
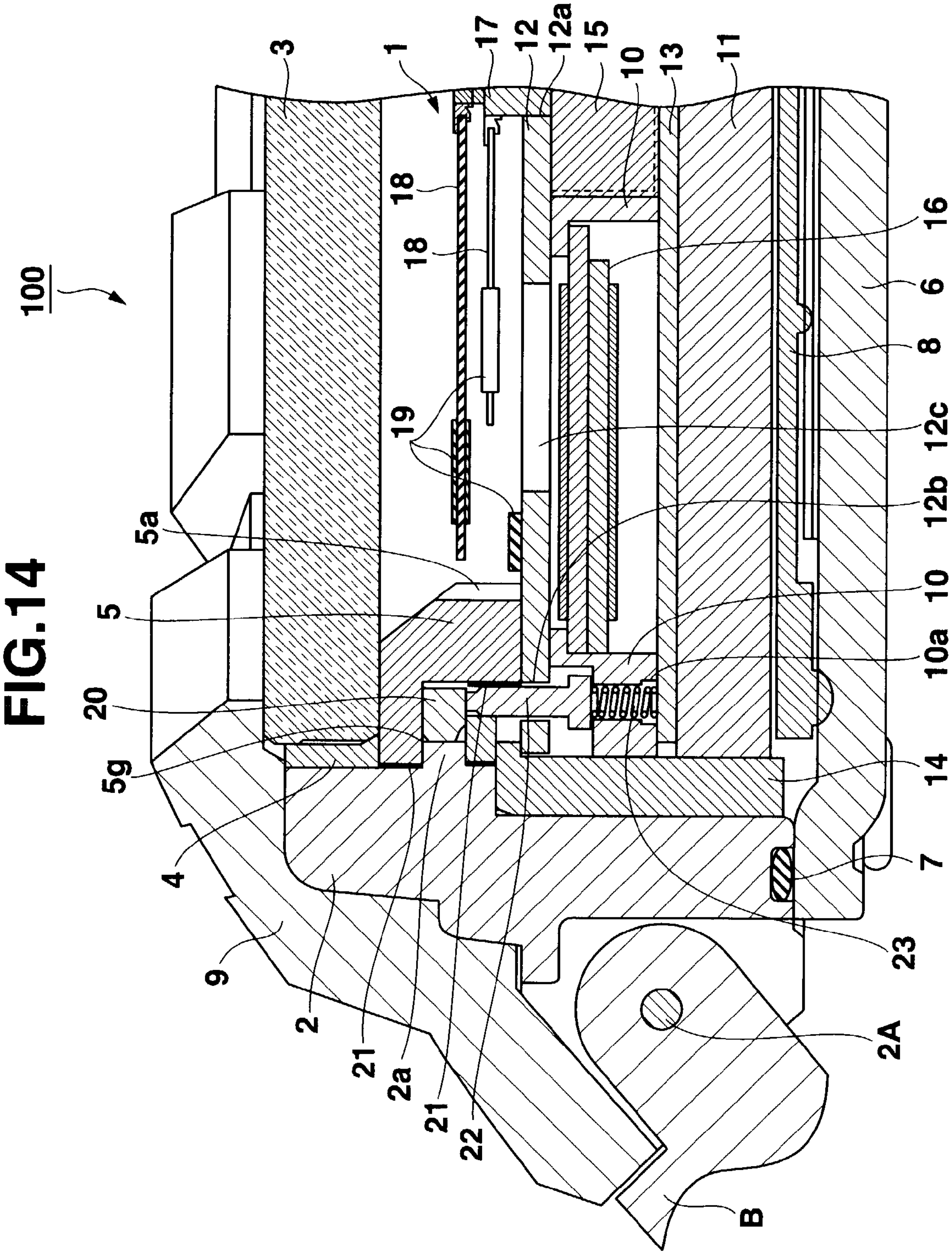
FIG. 14 is an enlarged sectional view of the main parts of a wristwatch showing the fifth embodiment according to the present invention.

As in the fifth embodiment shown in FIG. 14, it is also possible to form a mounting hole 5*g* in the outer circumferential surface of a frame-like member 5 and insert an ultraviolet light-emitting element 20 into this mounting hole 5*g* such that the light emission surface faces the inner circumferential surface of the frame-like member 5. With this structure also, the same functions and effects as the structure shown in FIG. 2 can be obtained.

(6) SIXTH EMBODIMENT

The sixth embodiment in which the present invention is applied to a wristwatch will be described below with reference to FIGS. 15 and 16. Note that the same reference numerals as in the first embodiment denote the same parts, and only different portions will be explained.

Figure 15:
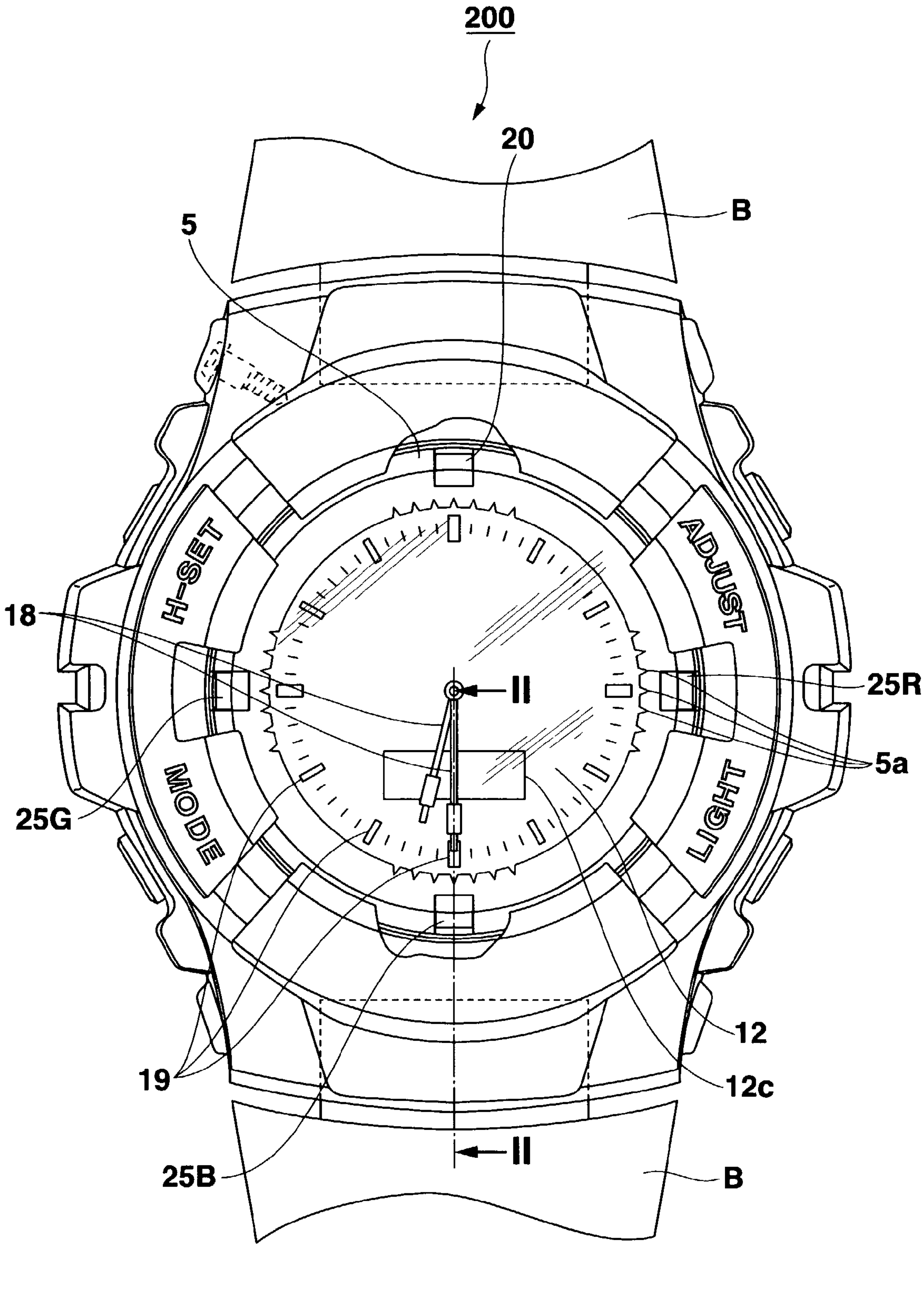
FIG. 15 is a partially omitted plan view showing the sixth embodiment of the wristwatch to which the present invention is applied.
Figure 16:
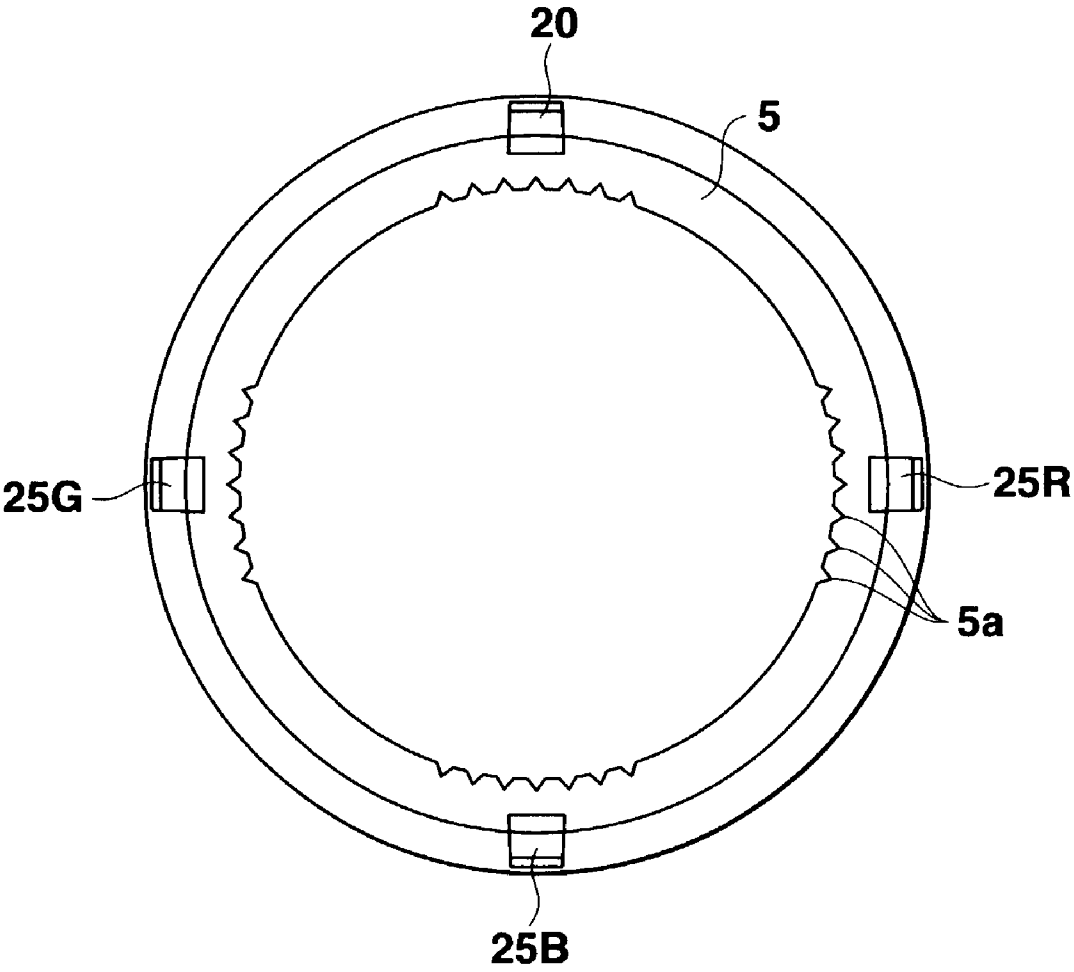
FIG. 16 is a view showing the arrangement of a frame-like member and light-emitting element in the sixth embodiment shown in FIG. 15.

As shown in FIGS. 15 and 16, light-emitting elements are arranged in predetermined portions, e.g., portions corresponding to 12, 3, 6, and 9 o'clock, of a frame-like member 5 of this wristwatch 200. Serrations 5*a* are formed on the inner circumferential surface of the frame-like member 5 having these light-emitting elements. In this embodiment, an ultraviolet light-emitting element 20 is formed in the portion corresponding to 12 o'clock, and visible light-emitting elements 25 are formed in the portions corresponding to 3, 6, and 9 o'clock.

In this wristwatch 200, as in the first embodiment, the ultraviolet light-emitting element 20 in the portion corresponding to 12 o'clock emits ultraviolet rays. The ultraviolet rays are guided by the frame-like member 5 and output from the serrations 5*a*. Therefore, even a light-emitting portion 19 separated from the ultraviolet light-emitting element 20 can be irradiated with the ultraviolet rays to emit light.

The visible light-emitting elements 25 formed in the portions corresponding to 3, 6, and 9 o'clock are a red color lamp 25R for emitting red light, blue color lamp 25B for emitting blue light, and green color lamp 25G for emitting green light, respectively.

When the red color lamp 25R formed in the portion corresponding to 3 o'clock emits red light, this red light is fed into the frame-like member 5 having light transmitting properties, so this frame-like member 5 is colored in red. In addition, this red light thus fed and guided by the frame-like member 5 is output from the serrations 5*a*, so a dial 12 and the like are also colored in red. Likewise, these parts are colored in blue or green by light emitted from the blue color lamp 25B or green color lamp 25G. Especially when light-reflecting portions 26 which reflect light by silver paint or mirror material are formed on the dial 12 and hands 18, reflected light from these light-reflecting portions 26 further improves the decorativeness.

Figure 17:
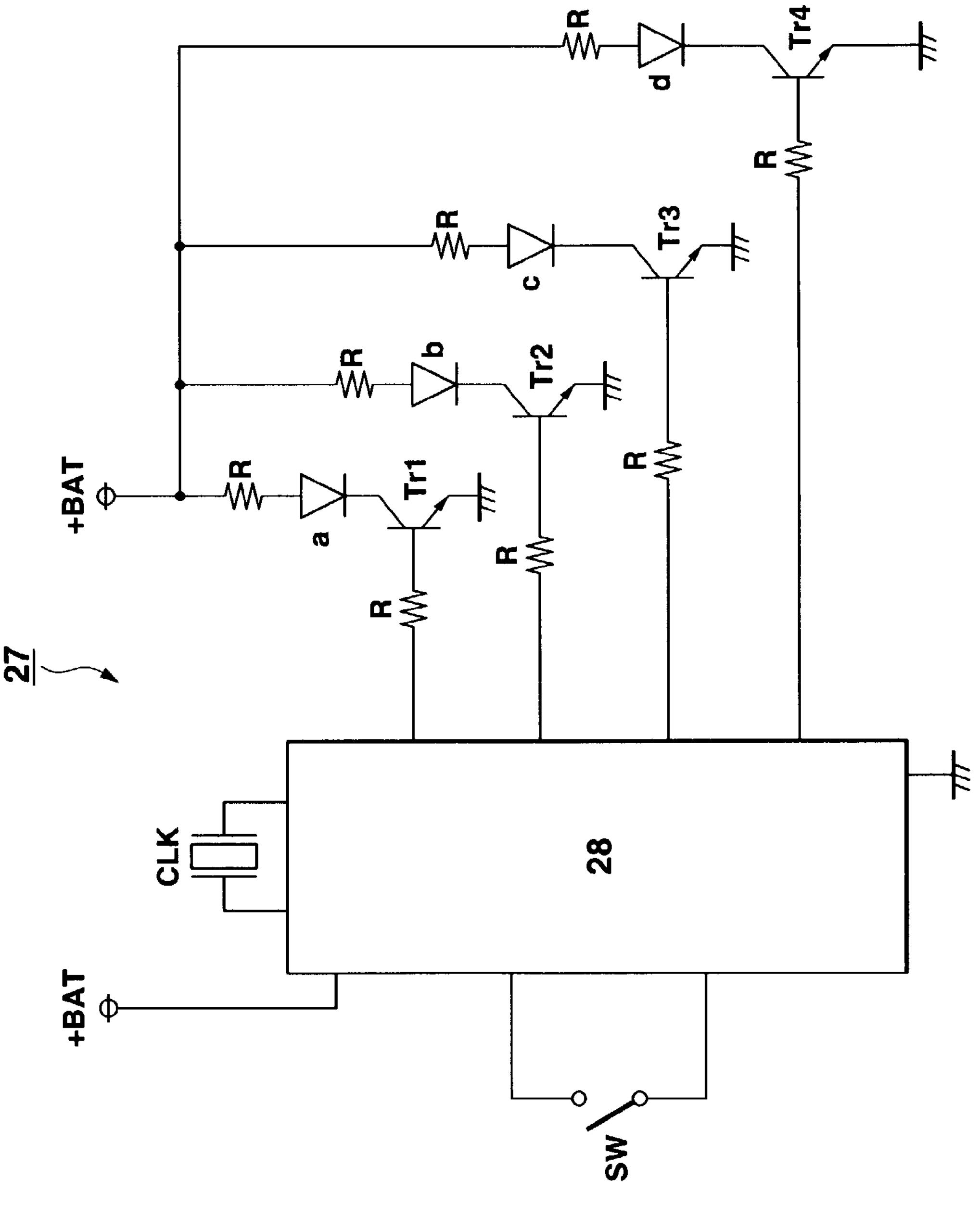
FIG. 17 is a circuit diagram showing a lighting switching circuit used in the sixth embodiment shown in FIG. 15.

As shown in FIG. 17, this wristwatch 200 also includes a lighting switching circuit (emission control means) 27 for controlling the emission timings of the light-emitting elements (the ultraviolet light-emitting element 20 and visible light-emitting elements 25).

This lighting switching circuit 27 is connected to a battery (BAT). A frequency divider (emission control means) 28 divides the frequency of the signal pattern of a reference clock (CLK). On the basis of this frequency-divided signal pattern, the lighting switching circuit 27 switches an electric current ON and OFF by transistors (Tr1, Tr2, Tr3, and Tr4), thereby controlling the emission timings of the light-emitting elements (in FIG. 17, diodes a, b, c, and d).

Figure 18A:
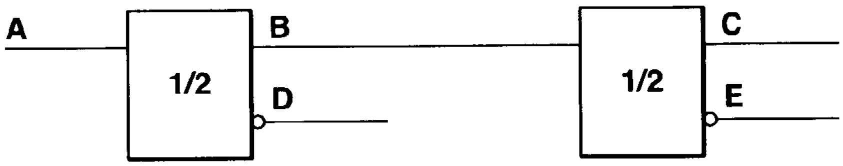
FIGS. 18A to 18E are circuit diagrams showing examples of a frequency divider shown in FIG. 17.
Figure 18B:
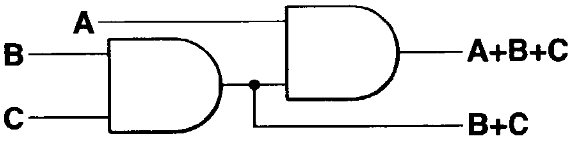
Figure 18C:
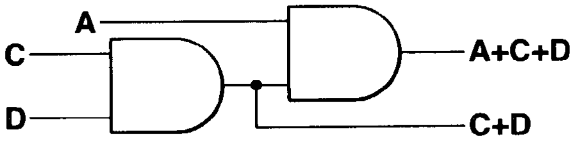
Figure 18D:
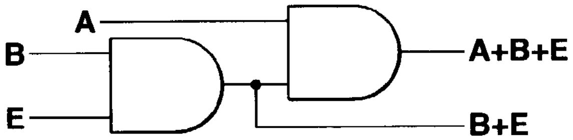
Figure 18E:
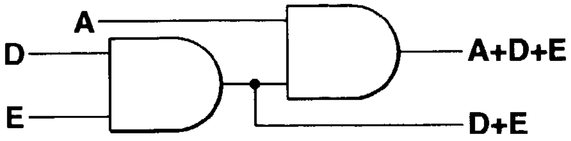

For example, the frequency divider 28 is composed up of a flip-flop circuit shown in FIG. 18A and AND circuits shown in FIGS. 18B to 18E. These AND circuits shown in FIGS. 18B to 18E divide the frequencies of signal patterns A, B, C, D, and E in the flip-flop circuit shown in FIG. 18A. On the basis of these frequency-divided signal patterns, the frequency divider 28 generates signals for causing the individual light-emitting elements to emit light at different timings.

Figures 19A, 19B, 19C:
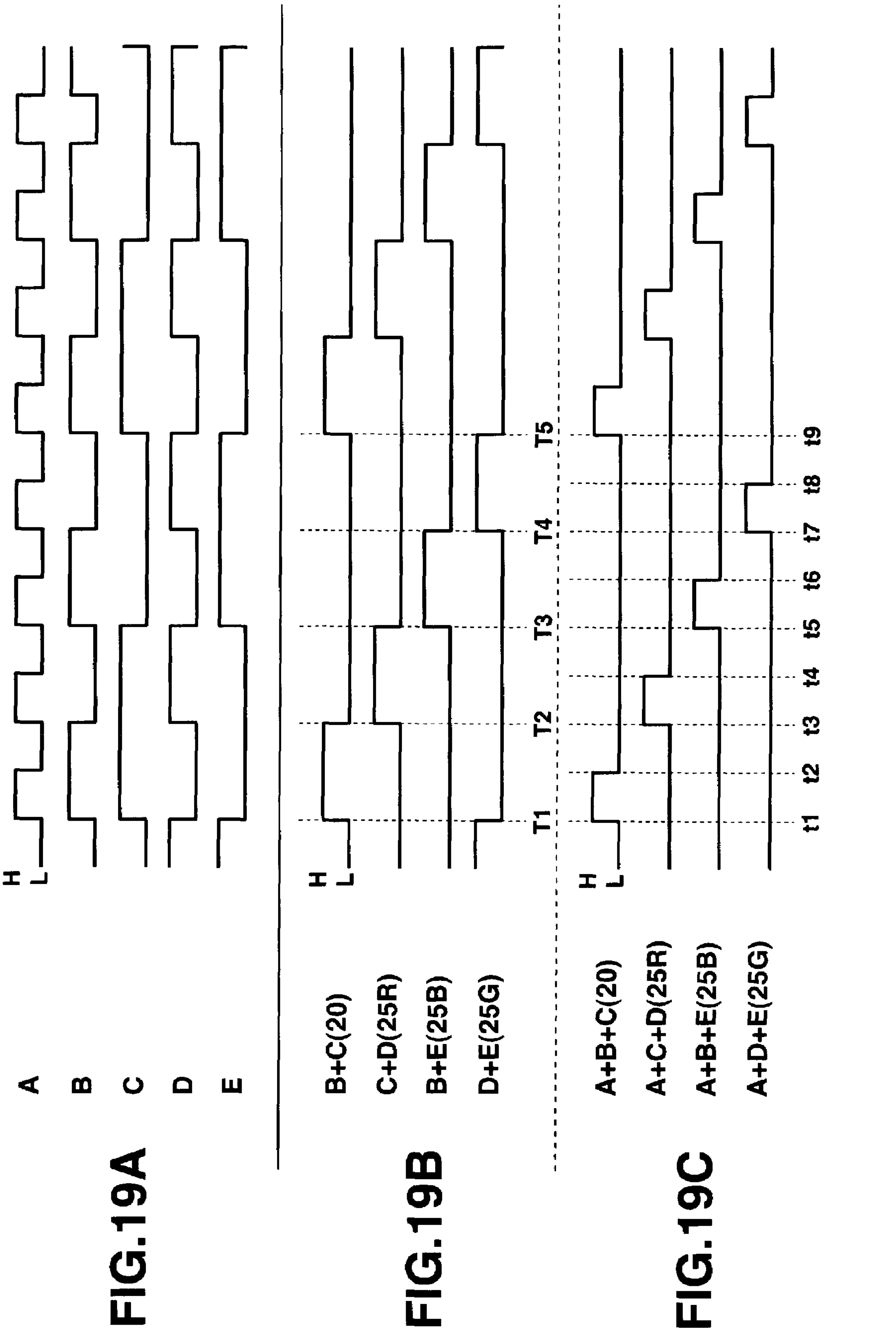
FIGS. 19A to 19C are timing charts showing examples of the timings of the frequency divider.

A timing chart shown in FIG. 19A indicates the signal patterns A, B, C, D, and E input to and output from the flip-flop circuit shown in FIG. 18A.

FIG. 19B shows emission timing signals of the individual light-emitting elements. For example, the emission timing of the ultraviolet light-emitting element 20 is an emission timing signal based on a signal pattern B+C. Likewise, the emission timing of the red color lamp 25R is a timing signal of a signal pattern C+D; the emission timing of the blue color lamp 25B is a timing signal of a signal pattern B+E; and the emission timing of the green color lamp 25G is a timing signal of a signal pattern D+E.

In this case, the timing signal of the ultraviolet light-emitting element 20 switches from L (Low) level to H (High) level at T1, and the ultraviolet light-emitting element 20 emits light on the basis of this switching. After emitting light for a predetermined time during which the timing signal maintains H level, the ultraviolet light-emitting element 20 is turned off when the timing signal switches from H level to L level at T2. Simultaneously, the timing signal of the red color lamp 25R switches from L level to H level at T2, so this red color lamp 25R emits light for a predetermined time. After that, the read color lamp 25R is turned off at T3. Likewise, the blue color lamp 25B and green color lamp 25G are turned on and off in this order. At T5, the emission timing of the ultraviolet light-emitting element 20 returns. In this manner, the four light-emitting elements are continuously turned on and off in turn.

FIG. 19C also shows emission timing signals of the individual light-emitting elements. For example, the emission timing of the ultraviolet light-emitting element 20 is an emission timing signal based on a signal pattern A+B+C. Likewise, the emission timing of the red color lam 25R is a timing signal of a signal pattern A+C+D; the emission timing of the blue color lamp 25B is a timing signal of a signal pattern A+B+E; and the emission timing of the green color lamp 25G is a timing signal of a signal pattern A+D+E.

In this case, the timing signal of the ultraviolet light-emitting element 20 switches from L level to H level at t1, and the ultraviolet light-emitting element 20 emits light on the basis of this switching. After emitting light for a predetermined time during which the timing signal maintains H level, the ultraviolet light-emitting element 20 is turned off when the timing signal switches from H level to L level at t2. In addition, all the light-emitting elements are kept OFF for a predetermined time during which all the timing signals maintain L level. After this predetermined time during which all the light-emitting elements are kept OFF, the timing signal of the red color lamp 25R switches from L level to H level at t3, so this red color lamp 25R emits light for a predetermined time. After that, the read color lamp 25R is turned off at t4. In addition, all the light-emitting elements are kept OFF for a predetermined time during which all the timing signals maintain L level. Likewise, the blue color lamp 25B and green color lamp 25G are turned on and off in this order. At t9, the emission timing of the ultraviolet light-emitting element 20 returns. In this manner, the four light-emitting elements are turned on and off in turn while they are simultaneously turned off at the same timing.

Note that the light-emitting element emission patterns based on the emission timing signals of the individual light-emitting elements shown in FIGS. 19B and 19C are patterns having timings at which these light-emitting elements formed in the frame-like member 5 emit light clockwise. However, the emission patterns are not limited to these patterns but can be counter-clockwise emission or random emission. That is, the emission timings of the light-emitting elements can be any arbitrary timing.

Note also that colors other than those emitted by the visible light-emitting elements 25 can be emitted by mixing the colors emitted by these visible light-emitting elements 25. For example, when the colors emitted by the visible light-emitting elements 25 are red, blue, and green, it is possible to emit purple light by mixing the red light and blue light, sky blue light by mixing the blue light and green light, yellow light by mixing the green light and red light, and white light by mixing the red light, blue light, and green light. That is, a total of seven colors can be emitted.

As described above, when some of the visible light-emitting elements 25 emit light at the same time, a color other than those emitted by these visible light-emitting elements 25 can be emitted on the basis of the combination of the colors of the visible light-emitting elements 25 which emit light at the same time. This realizes a highly decorative and entertaining light emission.

Also, more colorful and highly decorative light emission can be performed by combining the colors emitted by these visible light-emitting elements 25 and the light emission by the light-emitting units 19 caused by the ultraviolet rays output from the ultraviolet light-emitting elements 20.

In the sixth embodiment described above, light-emitting elements are the ultraviolet light-emitting elements 20 and visible light-emitting elements 25. However, the present invention is not restricted to this embodiment. For example, light-emitting elements can also be infrared light-emitting elements which emit infrared rays, and phosphors can be formed as light-emitting portions corresponding to these infrared light-emitting elements. For example, when infrared light-emitting elements and light-emitting portions (phosphors) which emit colored light in response to infrared rays are combined, the colorfulness and decorativeness of light emission can be further improved.

As described above, various light emission expressions can be made by various light emission forms. For example, on-and-off expression can be made by on-and-off light emission, and various colors can be expressed by mixing the colors emitted by the individual light-emitting elements.

(7) SEVENTH EMBODIMENT

Figure 20:
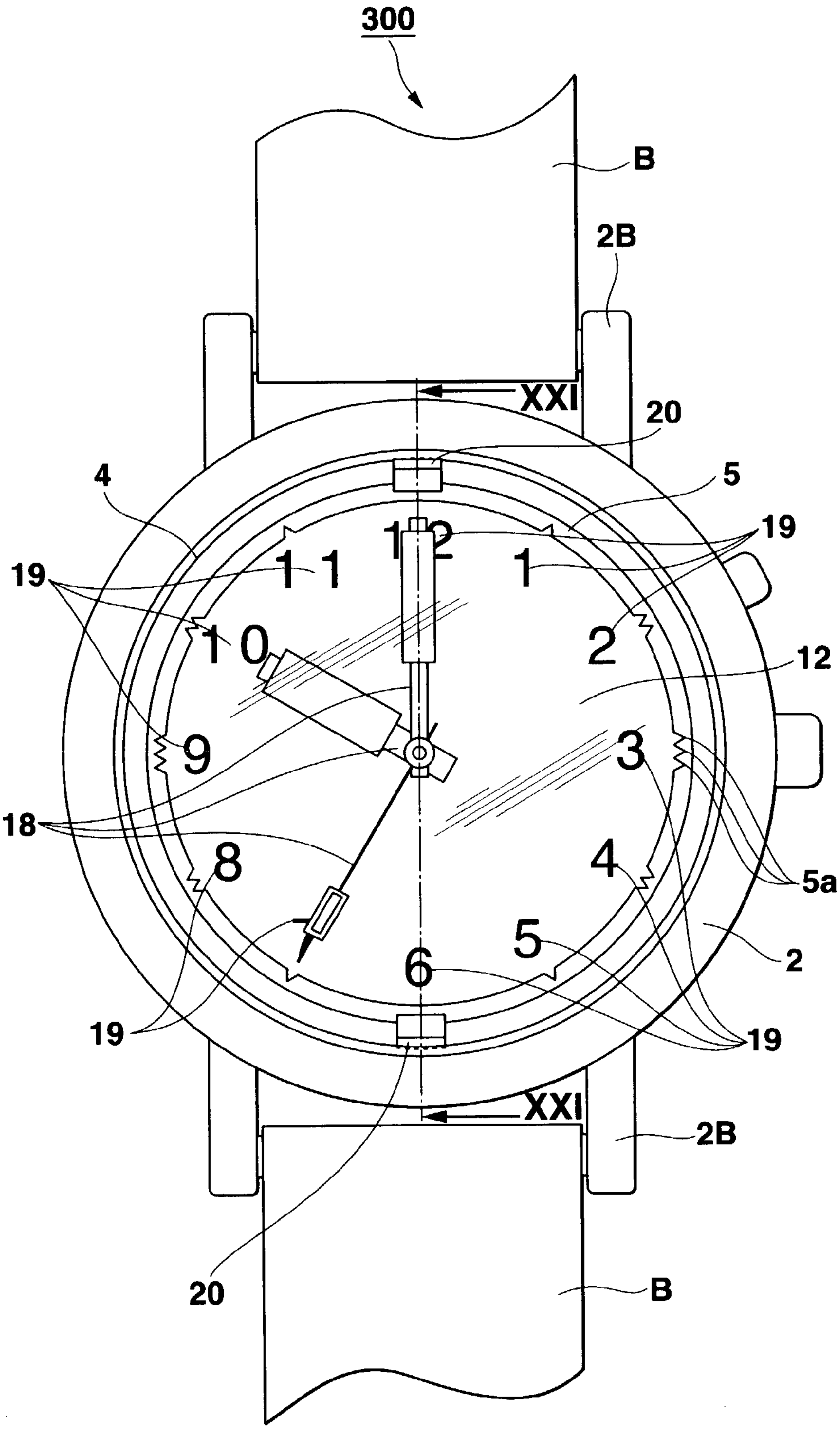
FIG. 20 is a partially omitted plan view showing the seventh embodiment of the wristwatch to which the present invention is applied.
Figure 21:
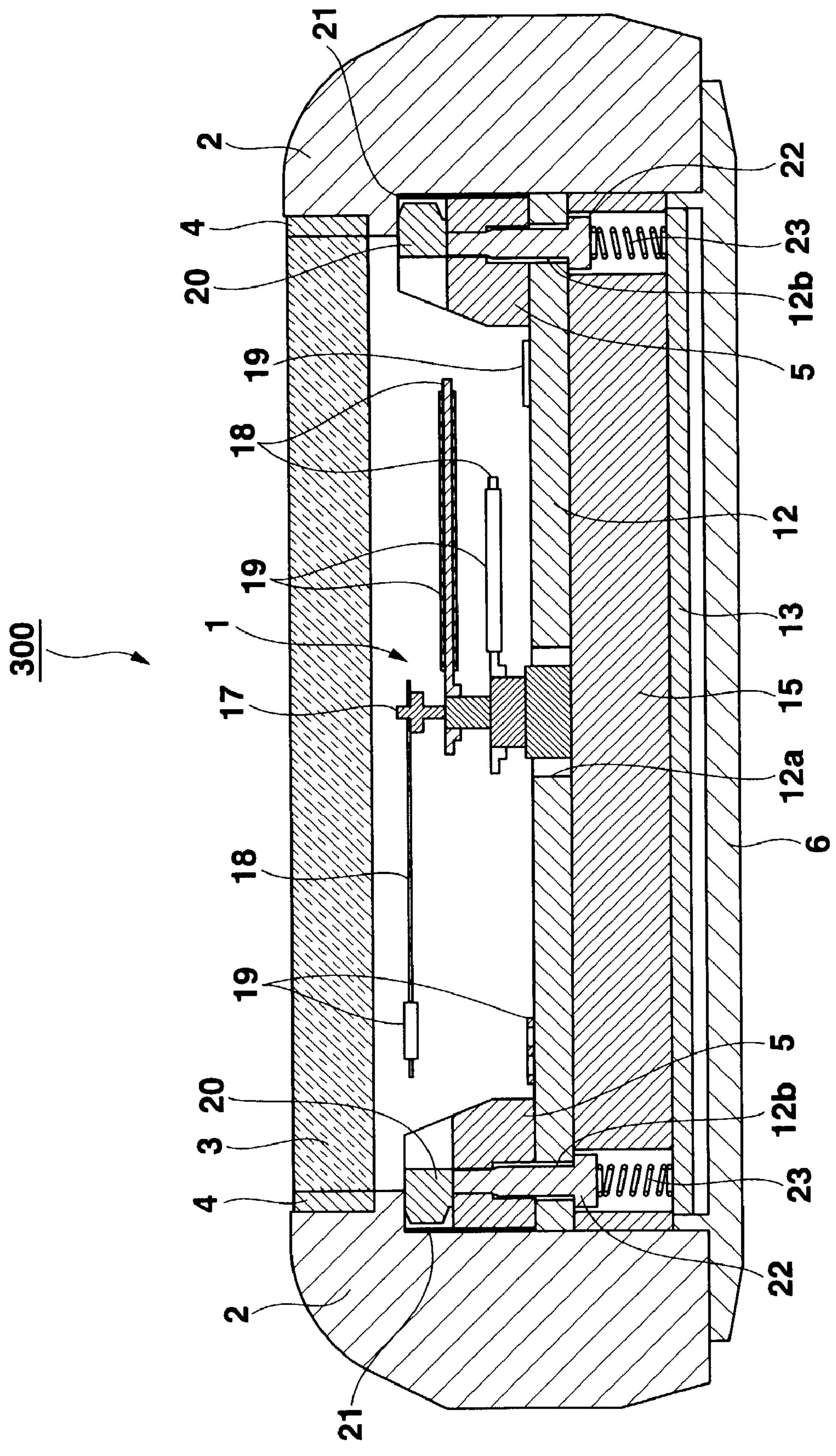
FIG. 21 is an enlarged sectional view of the major components of the wristwatch taken along a line XXI—XXI in FIG. 20.

The seventh embodiment in which the present invention is applied to a wristwatch will be described below with reference to FIGS. 20 to 27. FIG. 20 is a plan view showing the wristwatch of this embodiment. FIG. 21 is an enlarged view of the major components taken along a line XXI—XXI in FIG. 20.

In this seventh embodiment, a technique will be explained by which a plurality of desired portions, e.g., hour numeral portions corresponding to 1 to 12 o'clock are irradiated with the same amount of light, thereby causing light-emitting portions 19 formed in these portions to emit light of the same level. Note that the same reference numerals as in the first embodiment denote parts having the same functions, and only different portions will be explained.

As shown in FIGS. 20 and 21, this wristwatch 300 has a watch case 2 as an apparatus case for accommodating a watch module 1 as a light-emitting display device. Watch glass 3 is attached to the upper central portion of this watch case 2 via a packing 4. Also, a dial 12 is placed on the upper surface of an analog hand mechanism 15 of the watch module 1, and a frame-like member 5 is positioned on the upper surface of this dial 12. This frame-like member 5 is fitted on the inner circumferential surface of the watch case 2 such that the upper portion of the frame-like member 5 comes in contact with the watch case 2. A rear cover 6 is attached to the lower surface of the watch case 2. A watchband B is attached to band attaching portions 2B of the watch case 2.

The analog hand mechanism 15 has a hand shaft 17 extending upward from a shaft hole 12*a* formed in the dial 12, and hands 18 such as an hour hand, minute hand, and second hand attached to this hand shaft 17. These hands 18 move above the dial 12. The light-emitting portions 19 which emit colored light in response to light emitted from ultraviolet light-emitting elements 20 are formed in predetermined portions of the dial 12 and hands 18.

A circuit board 13 is placed on the lower surface of the analog hand mechanism 15. The ultraviolet light-emitting elements 20 electrically connected to this circuit board 13 via coil springs 23 and contact members 22 are arranged in the predetermined portions of the frame-like member 5 that correspond to the positions of 6 and 12 o'clock of the dial 12.

Irradiation of the light-emitting portions 19 with ultraviolet rays guided by the frame-like member 5 of the wristwatch 300 shown in FIG. 20 will be explained below with reference to FIG. 22.

Figure 22:
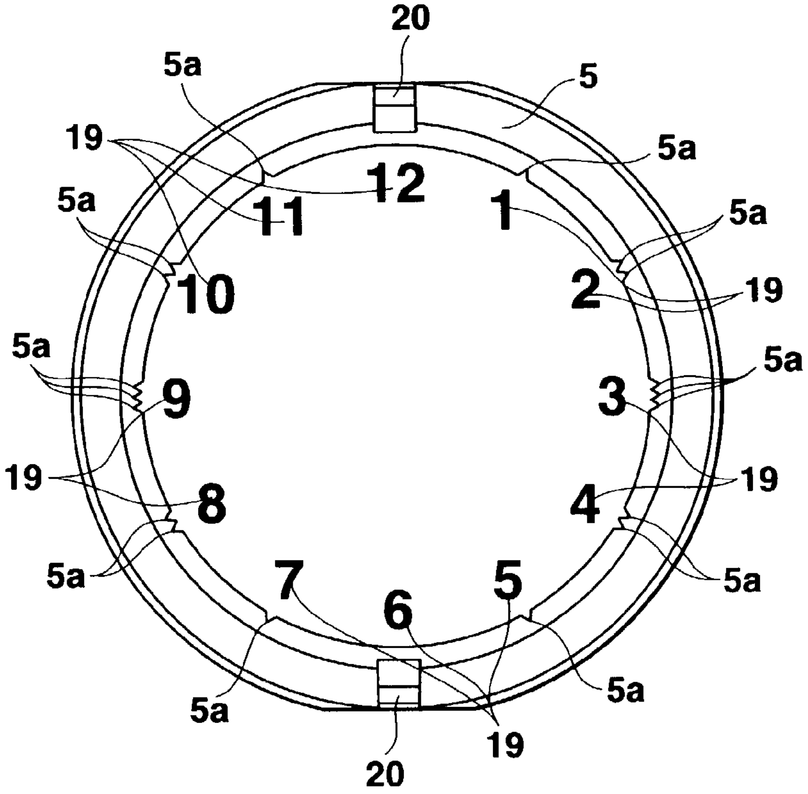
FIG. 22 is a view showing serrations of a frame-like member in the seventh embodiment according to the present invention.

In the frame-like member 5 shown in FIG. 22, serrations 5*a* are formed in positions corresponding to hour numerals on the dial 12. The numbers of these serrations 5*a* correspond to the distances from the positions of the ultraviolet light-emitting elements 20 formed in the frame-like member 5. More specifically, the number of the serrations 5*a* increases as the distance from the position of the ultraviolet light-emitting element 20 increases. For example, no serrations 5*a* are formed in portions corresponding to 12 and 6 o'clock in which the ultraviolet light-emitting elements 20 are formed. One serration 5*a* is formed in each of portions corresponding to 1, 5, 7, and 11 o'clock slightly separated from the ultraviolet light-emitting elements 20. Three serrations 5*a* are formed in each of portions corresponding to 3 and 9 o'clock farthest from the ultraviolet light-emitting elements 20. Two serrations 5*a* are formed in each of portions corresponding to 2, 4, 8, and 10 o'clock at a medium distance. The amounts of ultraviolet rays output by diffused reflection from portions in which the serrations 5*a* are formed are larger than those from portions where no serrations 5*a* are formed. Also, the larger the number of these serrations 5*a*, the larger the amount of ultraviolet rays output by diffused reflection. Accordingly, these numbers of serrations 5*a* balance the amounts of output ultraviolet rays from portions which are close to the ultraviolet light-emitting elements 20 and in which ultraviolet rays emitted from the ultraviolet light-emitting elements 20 are originally intense, with the amounts of output ultraviolet rays from portions which separated from the ultraviolet light-emitting elements 20 and in which ultraviolet rays guided by the frame-like member 5 are weak. This makes the amounts of ultraviolet rays output via the frame-like member 5 substantially uniform. Accordingly, the light-emitting portions 19 formed in the hour numeral portions from 1 to 12 o'clock on the dial 12 can emit light of substantially the same level.

Note that a plurality of serrations 5*a* form an aggregate and function as a light-radiating portion which radiates ultraviolet rays toward a predetermined hour numeral portion.

Figure 23:
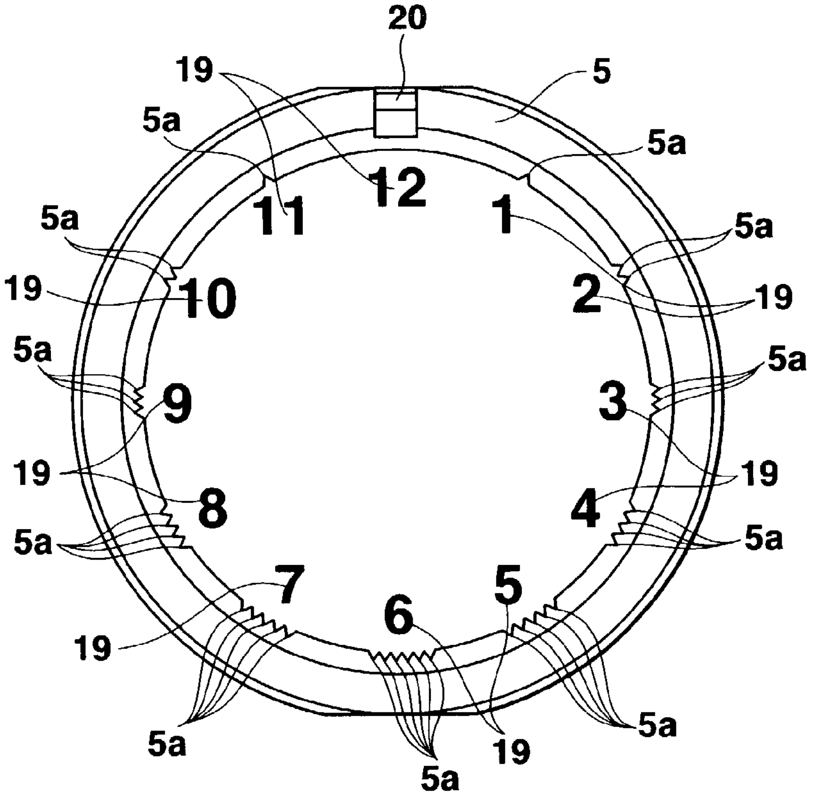
FIG. 23 is a view showing the first modification of the serrations of the frame-like member in the seventh embodiment according to the present invention.

When, for example, the ultraviolet light-emitting element 20 is formed only in a portion corresponding to the position of 12 o'clock as in the first modification of the seventh embodiment shown in FIG. 23, it is also not necessary to form serration 5*a* in this portion corresponding to 12 o'clock in which the ultraviolet light-emitting element 20 is formed, and, instead, form one serration 5*a* in each of slightly separated portions corresponding to 1 and 11 o'clock. The number of serrations 5*a* is increased as the distance from the ultraviolet light-emitting element 20 increases such that two serrations 5*a* are formed in each of portions corresponding to 2 and 10 o'clock, three serrations 5*a* are formed in each of portions corresponding to 3 and 9 o'clock, four serrations 5*a* are formed in each of portions corresponding to 4 and 8 o'clock, five serrations 5a are formed in each of portions corresponding to 5 and 7 o'clock, and six serrations 5a are formed in the farthest portion corresponding to 6 o'clock. By thus adjusting the number of serrations 5a of the frame-like member 5 in accordance with the number and positions of the ultraviolet light-emitting elements 20, the light-emitting portions 19 formed in the hour numeral portions from 1 to 12 o'clock on the dial 12 can emit light of substantially the same level.

Note that the positions and number of ultraviolet light-emitting elements 20 are arbitrary, and are not limited.

Figure 24:
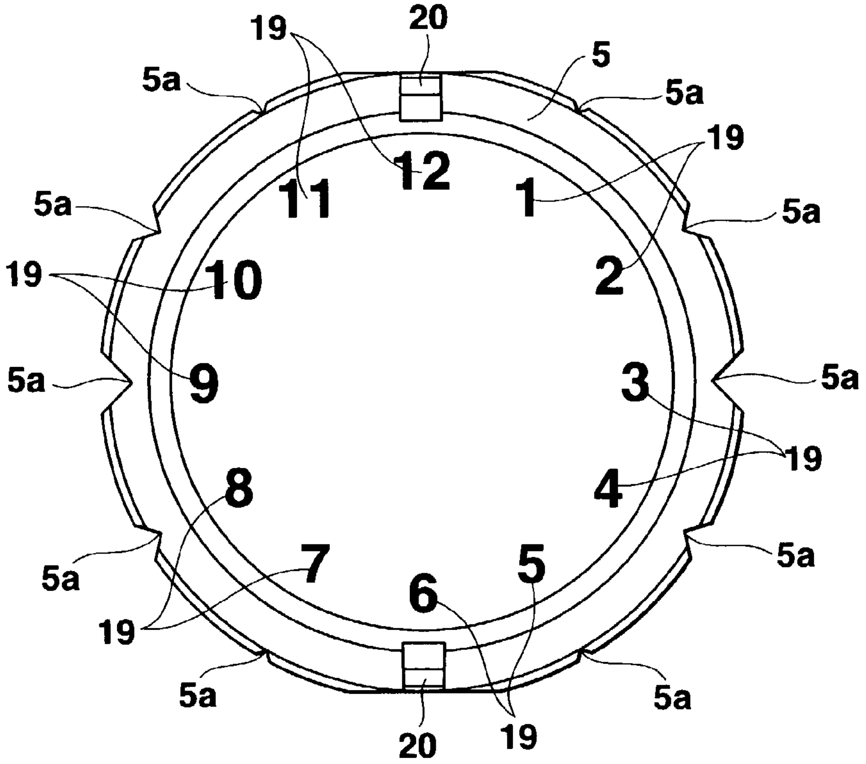
FIG. 24 is a view showing the second modification of the serrations of the frame-like member in the seventh embodiment according to the present invention.
Figure 25:
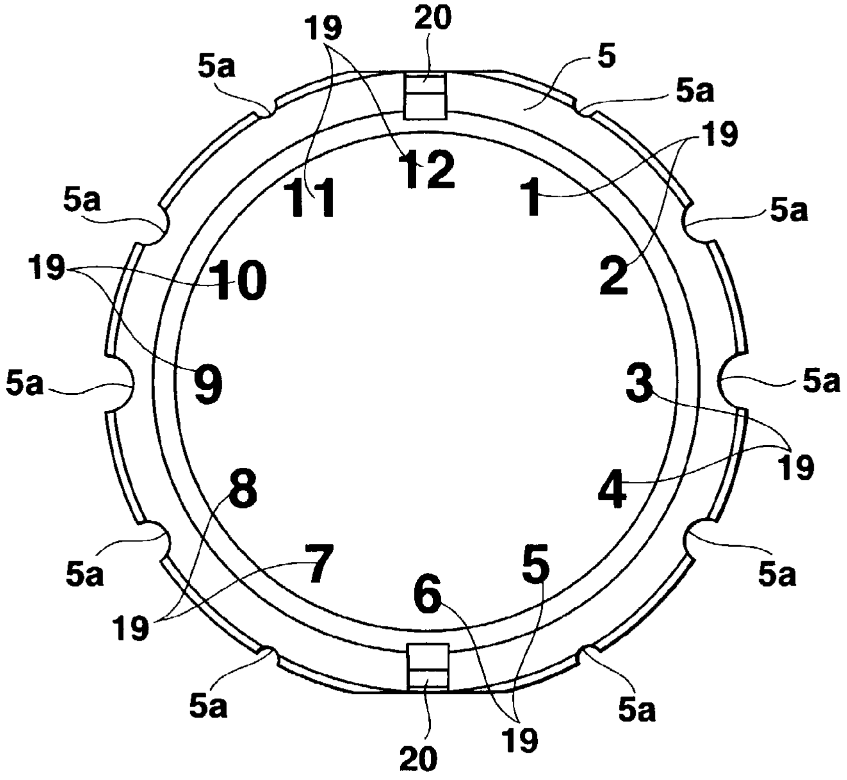
FIG. 25 is a view showing the third modification of the serrations of the frame-like member in the seventh embodiment according to the present invention.

Also, as in the second and third modifications of the seventh embodiment shown in FIGS. 24 and 25, respectively, serrations 5a can be formed on the outer circumferential surface side of the frame-like member 5. The inner circumferential surface side of the frame-like member 5 can be irradiated even with ultraviolet rays output to the outer circumferential surface side by diffused reflection of the ultraviolet rays or by reflection by a reflecting portion 21 formed on the inner wall of the watch case 2 in contact with the frame-like member 5.

Furthermore, when serrations 5a are to be formed in positions corresponding to the hour numerals on the dial 12, these serrations 5a of the frame-like member 5 can have sizes corresponding to the distances from the positions where the ultraviolet light-emitting elements 20 are formed. More specifically, a larger serration 5a is formed in a position further from the position of the ultraviolet light-emitting element 20. For example, no serrations 5a are formed in portions corresponding to 12 and 6 o'clock in which the ultraviolet light-emitting elements 20 are formed. Small serrations 5a are formed in slightly separated portions corresponding to 1, 5, 7, and 11 o'clock. Medium serrations 5a are formed in portions corresponding to 2, 4, 8, and 10 o'clock at a medium distance. Large serrations 5a are formed in portions corresponding to 3 and 9 o'clock farthest from the ultraviolet light-emitting elements 20.

The amounts of ultraviolet rays output by diffused reflection from portions where the serrations 5a are formed are larger than those from portions where no serrations 5a are formed, and increase as the sizes of these serrations 5a increase. This balances the amounts of output ultraviolet rays from portions which are close to the ultraviolet light-emitting elements 20 and in which ultraviolet rays emitted from the ultraviolet light-emitting elements 20 are originally intense, with the amounts of output ultraviolet rays from portions which are separated from the ultraviolet light-emitting elements 20 and in which ultraviolet rays guided by the frame-like member 5 are weak. This makes the amounts of ultraviolet rays output via the frame-like member 5 substantially uniform. Accordingly, the light-emitting portions 19 formed in the hour numeral portions from 1 to 12 o'clock on the dial 12 can emit light of substantially the same level.

Note that each serration 5a can have a notched square shape as in the second modification shown in FIG. 24, or a rounded shape (concave lens shape) as in the third modification shown in FIG. 25. That is, each serration 5a can have any shape provided that light can be radiated as it is converged or diverged.

Figure 26:
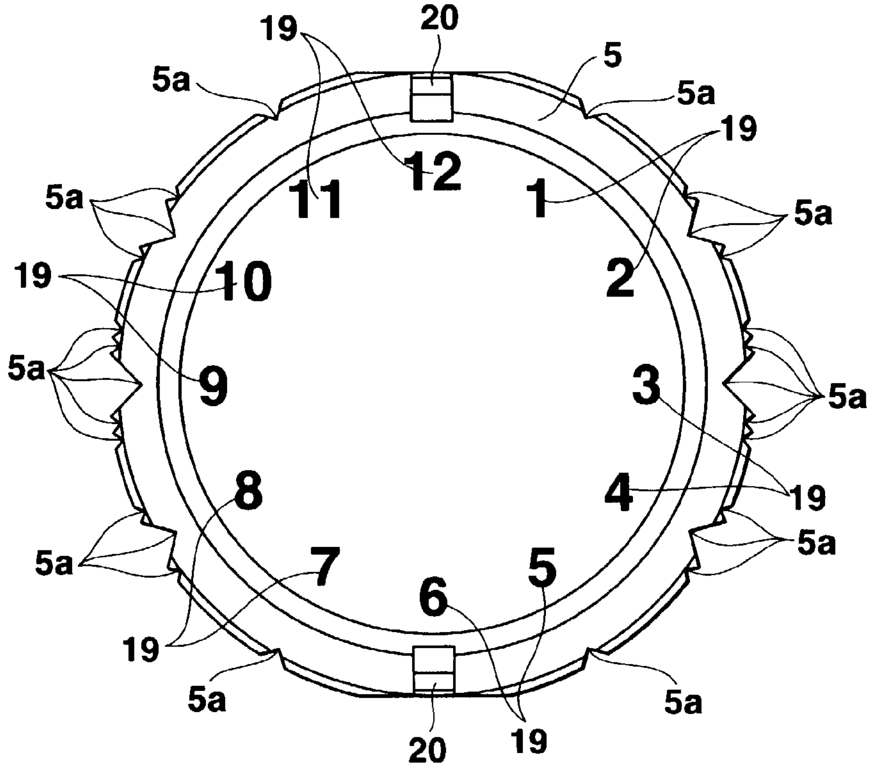
FIG. 26 is a view showing the fourth modification of the serrations of the frame-like member in the seventh embodiment according to the present invention.
Figure 27:
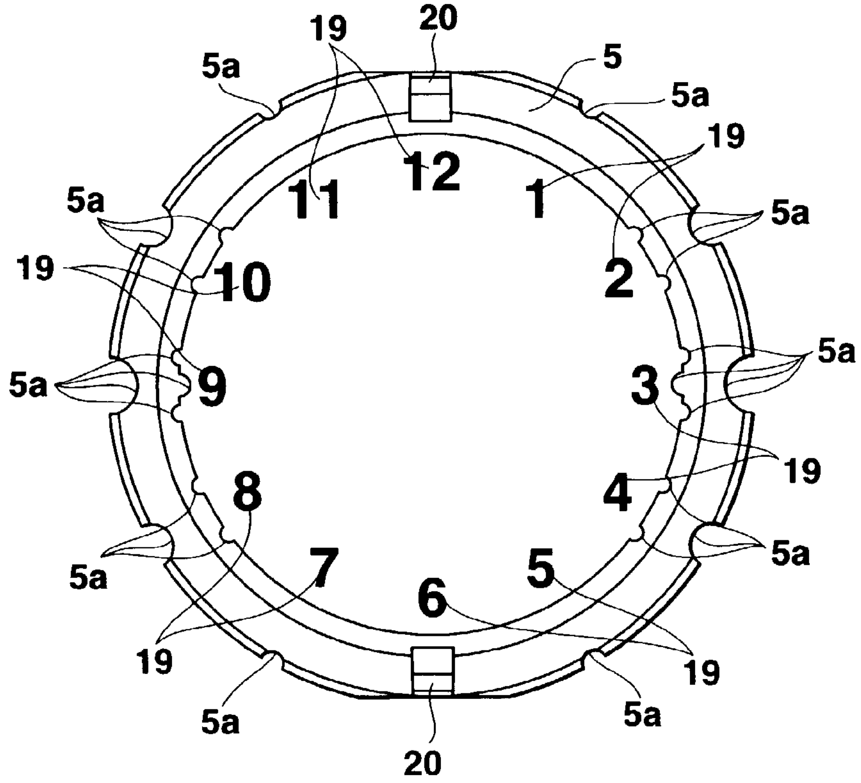
FIG. 27 is a view showing the fifth modification of the serrations of the frame-like member in the seventh embodiment according to the present invention.
Figure 28:
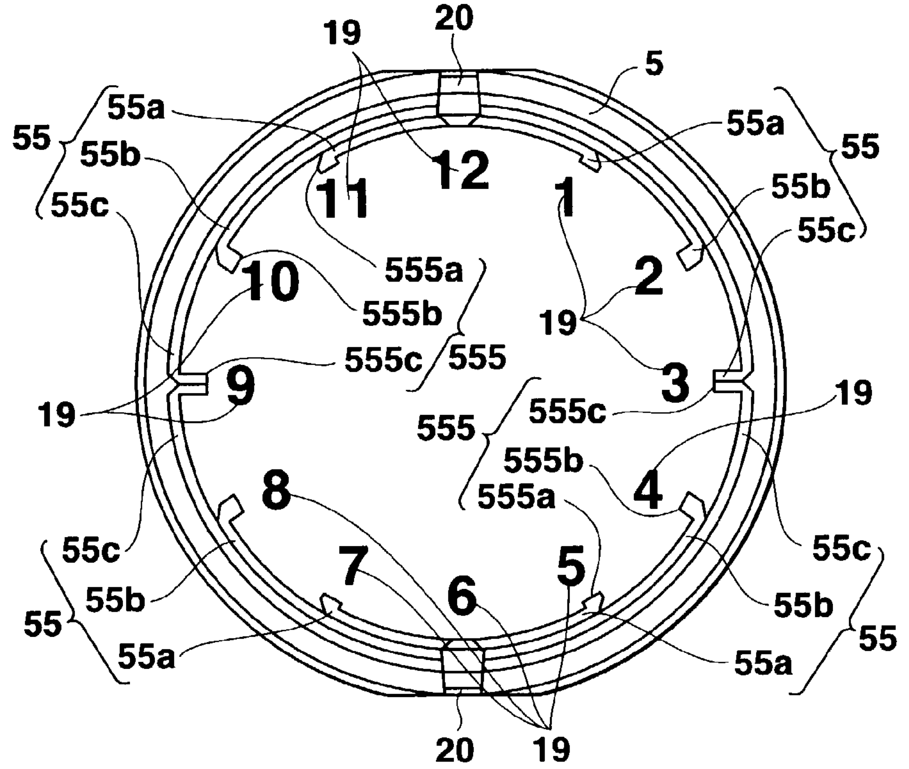
FIG. 28 is a view showing light guide members in the eighth embodiment according to the present invention.

Furthermore, as in the fourth and fifth modifications of the seventh embodiment shown in FIGS. 26 and 27, respectively, when serrations 5a are to be formed in positions corresponding to the hour numerals on the dial 12, these serrations 5a can be formed on either the inner or outer circumferential surface of the frame-like member 5 by changing the number and positions of the serrations 5a in accordance with the distance from the positions where the ultraviolet light-emitting elements 20 are formed. For example, in the fourth modification shown in FIG. 26, serrations 5a are formed only on the outer circumferential surface of the frame-like member 5. In the fifth modification shown in FIG. 27, serrations 5a are formed on both the inner and outer circumferential surfaces of the frame-like member 5. The fourth and fifth modifications are different in shape and size of the serration 5a. However, in both the fourth and fifth embodiments, no serrations 5a are formed in portions corresponding to 12 and 6 o'clock in which the ultraviolet light-emitting elements 20 are formed. One serration 5a is formed in each of slightly separated portions corresponding to 1, 5, 7, and 11 o'clock. Three serrations 5a are formed in each of portions corresponding to 2, 4, 8, and 10 o'clock at a medium distance. In portions corresponding to 3 and 9 o'clock farthest from the ultraviolet light-emitting elements 20, five serrations 5a are formed in the fourth modification, and four serrations 5a are formed in the fifth modification.

By thus adjusting both the number and positions of the serrations 5a formed on the frame-like member 5, the amounts of ultraviolet rays output via this frame-like member 5 can be made more uniform. This allows the light-emitting portions 19 formed on the hour numerals from 1 to 12 o'clock of the dial 12 to emit light of the same level. Note that the serration 5a can have any arbitrary shape.

(8) EIGHTH EMBODIMENT

The eighth embodiment in which the present invention is applied to a wristwatch will be described below with reference to FIGS. 28 to 31 and FIGS. 32A to 32C.

Note that this embodiment is applied to a wristwatch in substantially the same manner as the seventh embodiment. Therefore, the same reference numerals as in the seventh embodiment shown in FIGS. 20 and 21 denote parts having the same functions, and only different portions will be explained.

This wristwatch to which the eighth embodiment is applied has light guide members 55 which guide ultraviolet rays to a frame-like member 5.

Each light guide member 55 includes a plurality of light guide portions 55a, 55b, and 55c for separately guiding ultraviolet rays emitted from an ultraviolet light-emitting element 20. The light guided by these light guide portions 55a, 55b, and 55c is output, at positions corresponding to hour numerals on a dial 12, from light-exit portions 555 at the ends of the light guide portions 55a, 55b, and 55c, thereby irradiating light-emitting portions 19 formed on these hour numerals.

More specifically, the light guide members 55 extend from portions corresponding to 12 and 6 o'clock near the ultraviolet light-emitting elements 20 toward the individual hour numerals. For example, the light guide portion 55a having light-exit portions 555a facing the hour numerals of 1, 5, 7, and 11 o'clock, the light guide portions 55b having light-exit portions 555b facing the hour numerals of 2, 4, 8, and 10 o'clock, and the light guide portions 55c having light-exit portions 555c facing the hour numerals of 3 and 9 o'clock irradiate the light-emitting portions 19 on these hour numerals with ultraviolet rays. Note that the ultraviolet light-emitting elements 20 directly irradiate the hour numerals of 12 and 6 o'clock with ultraviolet rays.

In order that ultraviolet rays fed into the light guide members 55 be output without any loss from the light-exit portions 555, the side surfaces of the light guide portions

55_a_, 55_b_, and 55_c_ are preferably subjected to a mirror finish or the like, thereby reliably guiding ultraviolet rays.

The light guide portions 55_c_ extend from 12 and 6 o'clock, and their two light-exit portions 555_c_ are juxtaposed at each of the hour numerals of 3 and 9 o'clock. Hence, the size of these light-exit portions 555_c_ is adjusted to be half that of the light-exit portions 555_a_ and 555_b_; the size of the two light-exit portions 555_c_ is equal to the size of each of the light-exit portions 555_a_ and 555_b_. That is, the sizes of the light-exit portions 555 facing the individual hour numerals are made equal to each other, thereby irradiating the light-emitting portions 19 formed on these hour numerals with the same amount of ultraviolet rays.

As described above, ultraviolet rays emitted from the ultraviolet light-emitting elements 20 are guided by the light guide members 55 and output from the light-exit portions 555 at the ends of these light guide portions 55, thereby irradiating the light-emitting portions 19 formed on the hour numerals of 1 to 12 o'clock of the dial 12 with equal amounts of ultraviolet rays. This allows these light-emitting portions 19 to emit light of the same level.

Figure 29:
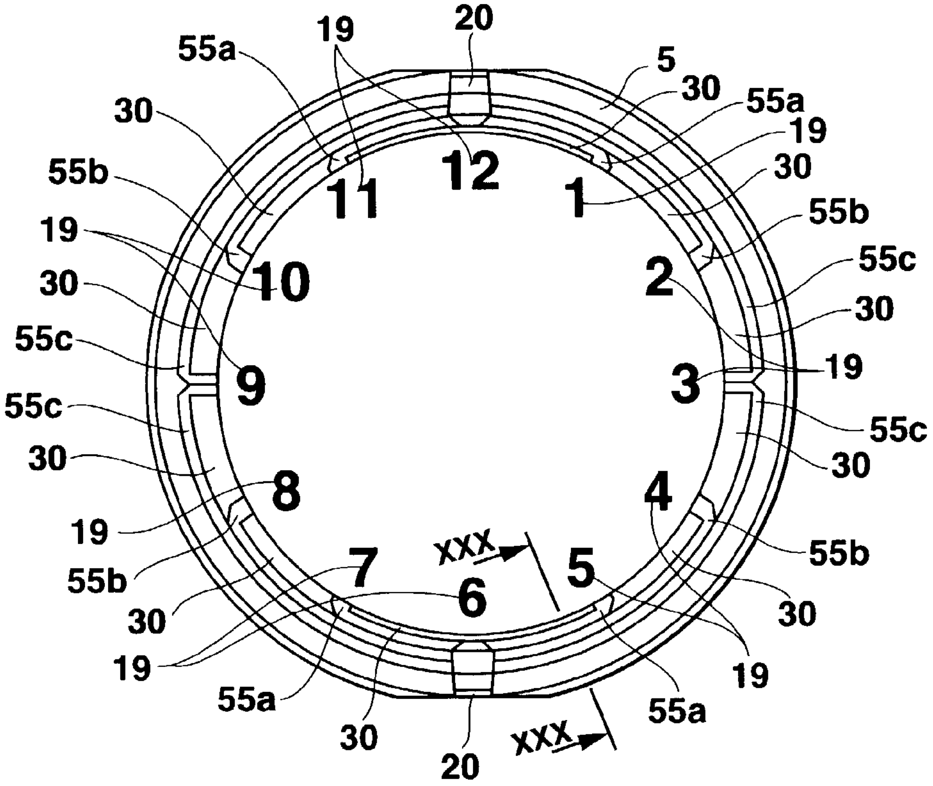
FIG. 29 is a view showing the first modification of the light guide members in the eighth embodiment according to the present invention.
Figure 30:
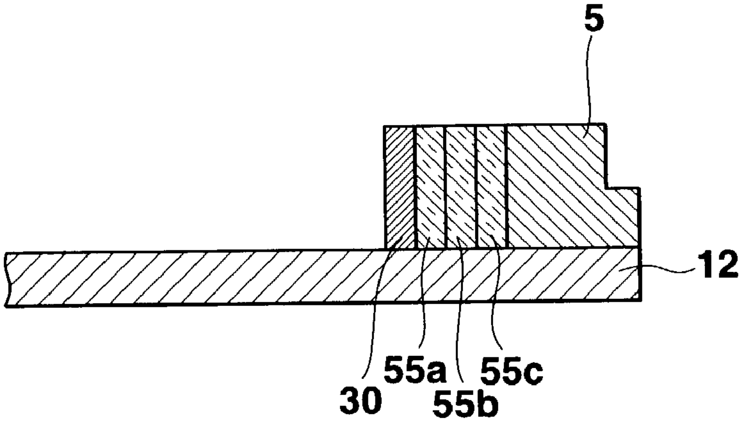
FIG. 30 is an enlarged view of a reinforcing member, the light guide member, and the frame-like member taken along a line XXX—XXX in FIG. 29.

In the first modification of the eighth embodiment shown in FIG. 29, reinforcing members 30 are formed in spaces between the light-exit portions 555 of the light guide portions 55_a_, 55_b_, and 55_c_, thereby reinforcing these light guide portions 55_a_, 55_b_, and 55_c_. FIG. 30 is a sectional view taken along a line XXX—XXX in FIG. 29. These reinforcing members 30 can form a structure in which the light guide portions 55_a_, 55_b_, and 55_c_ of the light guide members 55 are integrated, and can thereby reinforce the light guide members 55. In addition, the inner circumferential surfaces of these reinforcing members 30 are leveled with the releasing surfaces of the light-exit portions 555 of the light guide portions 55_a_, 55_b_, and 55_c_. This effectively gives the dial 12 a clear-cut outer appearance.

Figure 31:
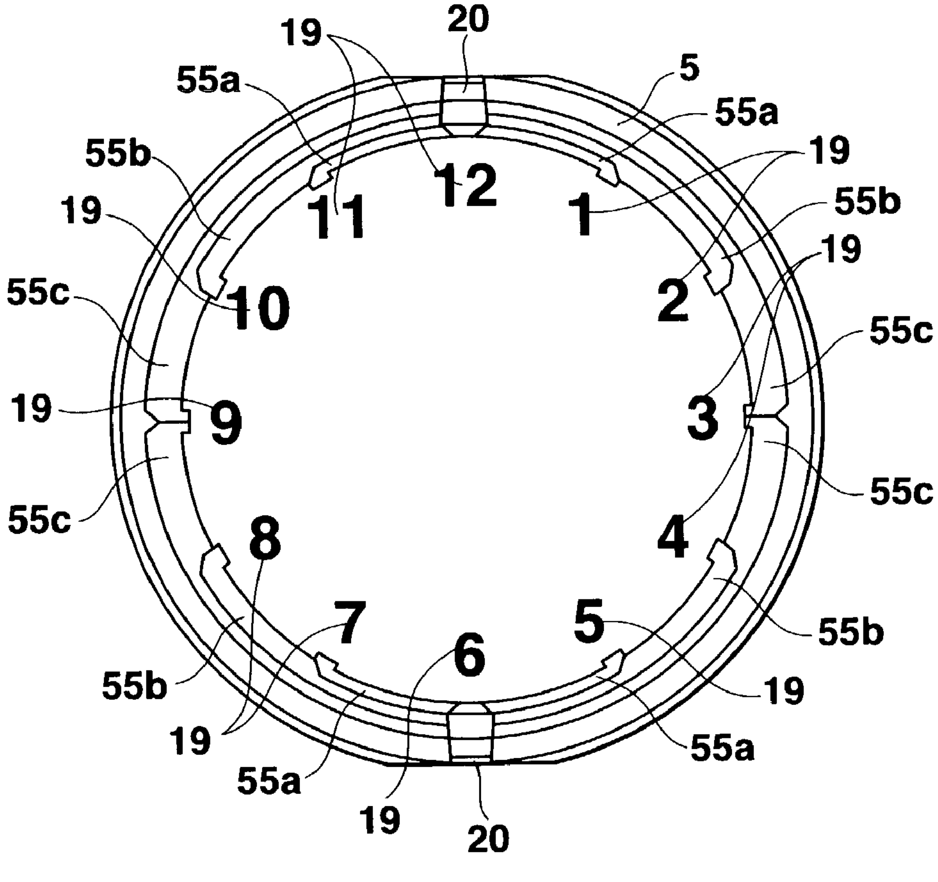
FIG. 31 is a view showing the second modification of the light guide members in the eighth embodiment according to the present invention.

In the second modification of the eighth embodiment shown in FIG. 31, the thicknesses of the light guide portions 55_a_, 55_b_, and 55_c_ of the light guide members 55 are made to partially differ, thereby making the inner circumferential surfaces of these light guide portions 55_a_, 55_b_, and 55_c_ substantially level with each other without forming any reinforcing members 30.

Figure 32A:
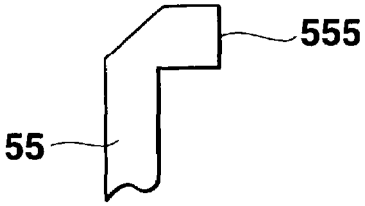
Figure 32B:
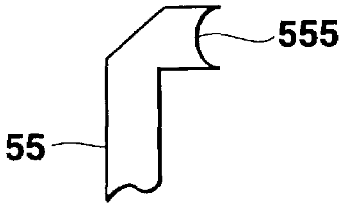
Figure 32C:
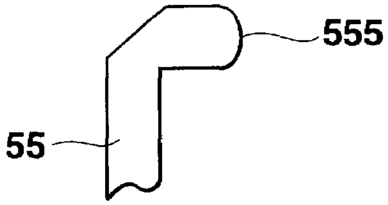

Note that the shape of the light-exit portion 555 of the light guide portion 55 is not limited to a planar shape as shown in FIGS. 28, 29, 31, and 32A. For example, the light-exit portion 555 can have a concave shape as shown in FIG. 32B or a convex shape as shown in FIG. 32C. With these shapes, ultraviolet rays can be radiated as they are diverged or converged.

(9) NINTH EMBODIMENT

The ninth embodiment, in which the present invention is applied to a wristwatch, will be described below with reference to FIGS. 33 and 34A to 34D.

In this embodiment, a technique will be explained by which even when a plurality of desired portions, e.g., hour numeral portions corresponding to 1 to 12 o'clock are irradiated with different amounts of ultraviolet rays, light-emitting portions 19 formed in these portions can emit light on the same level.

Note that the same reference numerals as in the seventh embodiment denote the same parts, and only different portions will be explained.

Figure 33:
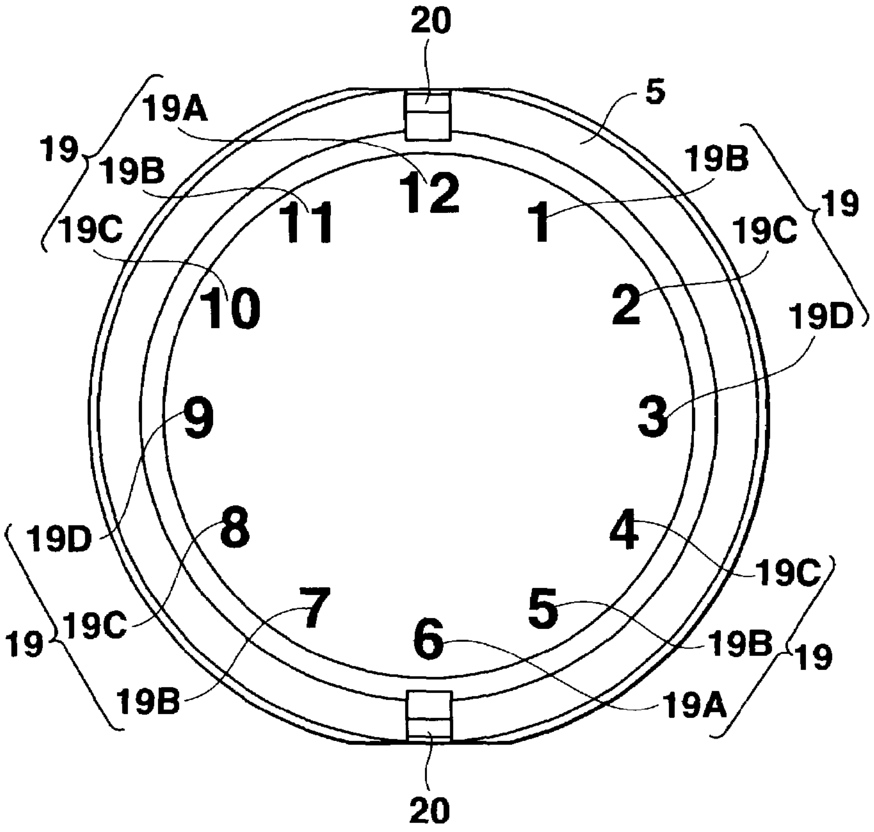
FIG. 33 is a view showing a frame-like member in the ninth embodiment according to the present invention.

When neither serrations 5_a_ nor light guide portions 55 as described above are formed as in a frame-like member 5 shown in FIG. 33, this frame-like member 5 irradiates a dial 12 (light-emitting portions 19) with ultraviolet rays in amounts corresponding to the distances from ultraviolet light-emitting elements 20. That is, as the distance from the position of the ultraviolet light-emitting element 20 increases, ultraviolet rays guided by the frame-like member 5 weaken, so the amount of output ultraviolet rays reduces. Accordingly, the amount of ultraviolet rays output to portions corresponding to 12 and 6 o'clock in which the ultraviolet light-emitting elements 20 are formed is the largest. The amount of ultraviolet rays reduces in portions corresponding to 1, 5, 7, and 11 o'clock and in portions corresponding to 2, 4, 8, and 10 o'clock, i.e., the amount of ultraviolet rays reduces as the distance from the ultraviolet light-emitting elements 20 increases. The amount of ultraviolet rays output to portions corresponding to 3 and 9 o'clock is the smallest.

Even when the amounts of ultraviolet rays output from the frame-like member 5 to irradiate the light-emitting portions 19 in the individual hour numeral portions are different, these light-emitting portions 19 in the hour numeral portions can emit light of the same level by adjusting the amount of phosphor contained in each light-emitting portion 19. That is, the amount or colored light emitted from a light-emitting substance, such as phosphor (a photoreactive material), upon exposure ultraviolet rays, increases in proportion to the amount of the photoreactive material. This embodiment uses this property.

More specifically, a thicker light-emitting portion 19 is formed on an hour numeral further from the position of the ultraviolet light-emitting element 20. For example, when the light-emitting portions 19 are formed by coating or printing as shown in FIGS. 34A to 34D, the thickness and amount of each light-emitting portion 19 can be adjusted by changing the number of times of coating or printing.

Figure 34A:
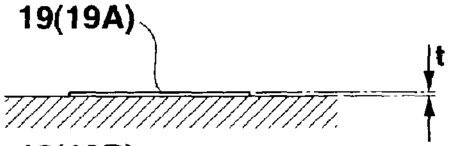
FIGS. 34A to 34D are side sectional views showing differences between the thicknesses of light-emitting portions in the ninth embodiment according to the present invention.

For example, as shown in FIG. 34A, as the light-emitting portion 19 in each of the portions corresponding to 12 and 6 o'clock in which the ultraviolet light-emitting elements 20 are formed, a light-emitting portion 19A having a thickness (t) of one layer is formed by performing coating or printing once.

Figure 34B:
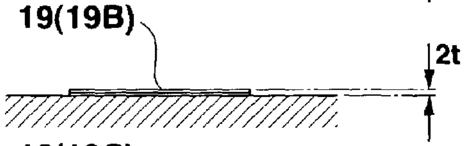

Assume that the amount of ultraviolet rays in the portions corresponding to 1, 5, 7, and 11 o'clock slightly separated from the ultraviolet light-emitting elements 20 is ½ the amount of ultraviolet rays in the light-emitting portion 12A. In this case, as shown in FIG. 34B, as the light-emitting portion 19 in each of these portions corresponding to 1, 5, 7, and 11 o'clock, a light-emitting portion 19B having a double thickness, i.e., a thickness (2t) of two layers is formed by performing coating or printing twice. This can make the emission level of this light-emitting portion 19B the same as the light-emitting portion 19A.

Figure 34C:
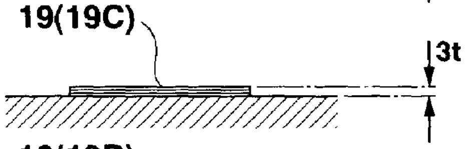
Figure 34D:
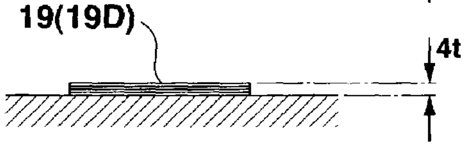

Likewise, assume that the amount of ultraviolet rays in the portions corresponding to 2, 4, 8, and 10 o'clock at a medium distance from the ultraviolet light-emitting elements 20 is ⅓ the amount of ultraviolet rays in the light-emitting portion 12A. In this case, as shown in FIG. 34C, as the light-emitting portion 19 in each of these portions corresponding to 2, 4, 8, and 10 o'clock, a light-emitting portion 19C having a triple thickness, i.e., a thickness (3t) of three layers is formed by performing coating or printing three times. Assume that the amount of ultraviolet rays in the portions corresponding to 3 and 9 o'clock furthest from the ultraviolet light-emitting elements 20 is ¼ the amount of ultraviolet rays in the light-emitting portion 12A. In this case, as shown in FIG. 34D, as the light-emitting portion 19 in each of these portions corresponding to 3 and 9 o'clock, a light-emitting portion 19D having a fourfold thickness, i.e., a thickness (4t) of four layers is formed by performing coating or printing four times. Consequently, the emission levels of these light-emitting portions 19C and 19D can be made the same as the light-emitting portion 19A.

By thus changing the thickness and amount of each light-emitting portion 19 in accordance with the amount of ultraviolet rays in the position of this light-emitting portion 19, the levels of light emission of the different light-emitting portions 19 (the light-emitting portions 19A, 19B, 19C, and 19D) can be made uniform. This is so because when the amount of each light-emitting portion 19 is adjusted, the amount of phosphor as this light-emitting portion 19 also changes, and this changes the light-emitting particle amount in the light-emitting portion 19 to change its emission level.

In the ninth embodiment described above, in order to make the emission levels of the individual light-emitting portions 19 uniform, the adjustment is performed by changing the thickness and amount of each light-emitting portion 19. The adjustment is thus performed by changing the thickness and amount of each light-emitting portion 19, in order to change the light-emitting particle amount in a phosphor as the light-emitting portion 19. To adjust the emission level, therefore, this light-emitting particle amount need only be adjusted. Accordingly, when light-emitting portions 19 are formed using phosphors different in concentration and content of light-emitting particles, the emission levels can be adjusted by using the light-emitting portions 19 having the same thickness and amount.

(10) 10th EMBODIMENT

The 10th embodiment in which the present invention is applied to a wristwatch will be described below with reference to FIGS. 35A to 35H.

In this 10th embodiment, as in the ninth embodiment, a technique will be explained by which even when a plurality of desired portions, e.g., hour numeral portions corresponding to 1 to 12 o'clock are irradiated with different amounts of ultraviolet rays, light-emitting portions 19 formed in these portions are allowed to emit light on the same level.

Note that the same reference numerals as in the ninth embodiment denote the same parts, and only different portions will be explained.

As in the ninth embodiment, this invention of the 10th embodiment shown in FIGS. 35A to 35H uses a frame-like member 5 having neither serrations 5*a* nor light guide members 55. Light-shielding members 40 (40*a*, 40*b*, and 40C) which shield radiated ultraviolet rays are formed on the surfaces of the light-emitting portions 19 to adjust the amounts of ultraviolet rays reaching these light-emitting portions 19, thereby adjusting the emission levels of the light-emitting portions 19. Consequently, these light-emitting portions 19 can emit light substantially uniformly. That is, the light-emitting portions 19 having the same emission level are formed on the individual hour numerals. If the amounts of ultraviolet rays in these hour numeral portions are different, the emission levels are also different on the basis of the ultraviolet ray amounts. To make the emission levels substantially uniform, therefore, a light-shielding member 40 having a large light-shielding area is formed on the surface of the light-emitting portion 19 irradiated with a large amount of ultraviolet rays, thereby partially shielding ultraviolet rays. This permits equal amounts of ultraviolet rays to reach the individual light-emitting portions 19. As a consequence, the emission levels of these light-emitting portions 19 can be made substantially uniform. FIGS. 35A, 35C, 35E, and 35G are side views of the light-emitting portions 19 and their vicinities. FIGS. 35B, 35D, 35F, and 35H are plan views of the light-emitting portions 19 (light-shielding members 40).

More specifically, assume that the amount of ultraviolet rays irradiating the light-emitting portions 19 in portions corresponding to 12 and 6 o'clock in which ultraviolet light-emitting elements 20 are formed is the reference (1=4/4), the amount of ultraviolet rays in hour numeral portions corresponding to 1, 5, 7, and 11 o'clock slightly separated from the ultraviolet light-emitting elements 20 is ¾, the amount of ultraviolet rays in hour numeral portions corresponding to 2, 4, 8, and 10 o'clock at a medium distance from the ultraviolet light-emitting elements 20 is 2/4, and the amount of ultraviolet rays in hour numeral portions corresponding to 3 and 9 o'clock farthest from the ultraviolet light-emitting elements 20 is ¼.

Figure 35A:
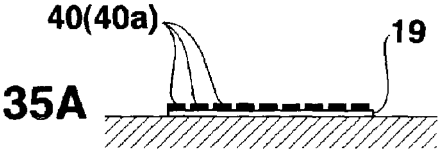
FIGS. 35A, 35C, 35E, and 35G are side sectional views showing differences between the light-shielding areas of light-shielding members provided on the light-emitting portion in the 10th embodiment according to the present invention.
Figure 35B:
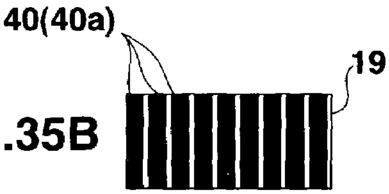
FIGS. 35B, 35D, 35F, and 35H are plan views of the light-shielding members provided on the light-emitting portion in the 10th embodiment of the present invention.
Figure 35C:
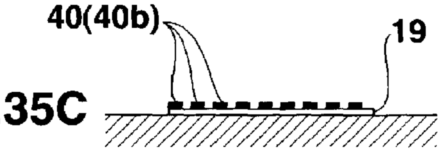
Figure 35D:
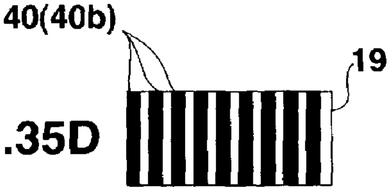
Figure 35E:
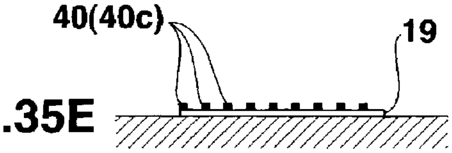
Figure 35F:
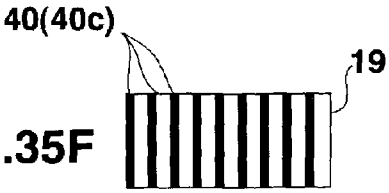
Figure 35G:
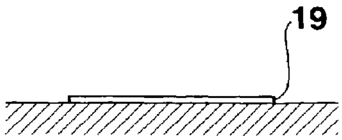
Figure 35H:
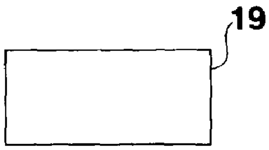

In this case, no light-shielding members 40 are formed on the light-emitting portions 19 in the hour numeral portions corresponding to 3 and 9 o'clock in which the amount of ultraviolet rays radiated from the frame-like member 5 is the smallest (FIGS. 35G and 35H). On the light-emitting portions 19 irradiated with large amounts of ultraviolet rays from the frame-like member, the light-shielding members 40 having sizes corresponding to these large ultraviolet ray amounts are formed. That is, on each of those light-emitting portions 19 in the hour numeral portions corresponding to 12 and 6 o'clock, which are irradiated with ultraviolet rays in amount four times as large as ultraviolet rays irradiating the light-emitting portions 19 in the hour numeral portions corresponding to 3 and 9 o'clock, the light-shielding member 40*a* covering ¾ of the surface of the light-emitting portion 19 is formed, as shown in FIGS. 35A and 35B, to reduce a portion irradiated with ultraviolet rays to ¼.

Similarly, on each of those light-emitting portions 19 in the hour numeral portions corresponding to 1, 5, 7, and 11 o'clock, which are irradiated with ultraviolet rays in amount three times as large as ultraviolet rays irradiating the light-emitting portions 19 in the hour numeral portions corresponding to 3 and 9 o'clock, the light-shielding member 40*b* covering ⅔ of the surface of the light-emitting portion 19 is formed, as shown in FIGS. 35C and 35D, to reduce a portion irradiated with ultraviolet rays to ⅓. On each of those light-emitting portions 19 in the hour numeral portions corresponding to 2, 4, 8, and 10 o'clock, which are irradiated with ultraviolet rays in amount twice as large as ultraviolet rays irradiating the light-emitting portions 19 in the hour numeral portions corresponding to 3 and 9 o'clock, the light-shielding member 40*c* covering ½ of the surface of the light-emitting portion 19 is formed, as shown in FIGS. 35E and 35F, to reduce a portion irradiated with ultraviolet rays to ½.

As described above, when a plurality of light-emitting portions 19 having the same thickness are formed and irradiated with different amounts of ultraviolet rays, the light-shielding members 40 corresponding to the ultraviolet ray amounts are formed on the surfaces of these light-emitting portions 19. Since this makes the amounts of ultraviolet rays reaching the light-emitting portions 19 substantially uniform, the emission levels can be made substantially uniform.

(11) 11th EMBODIMENT

The 11th embodiment in which the present invention is applied to a wristwatch will be described below with reference to FIGS. 36 and 37. Note that the same reference numerals as in the seventh embodiment denote the same parts, and only different portions will be explained.

Figure 36:
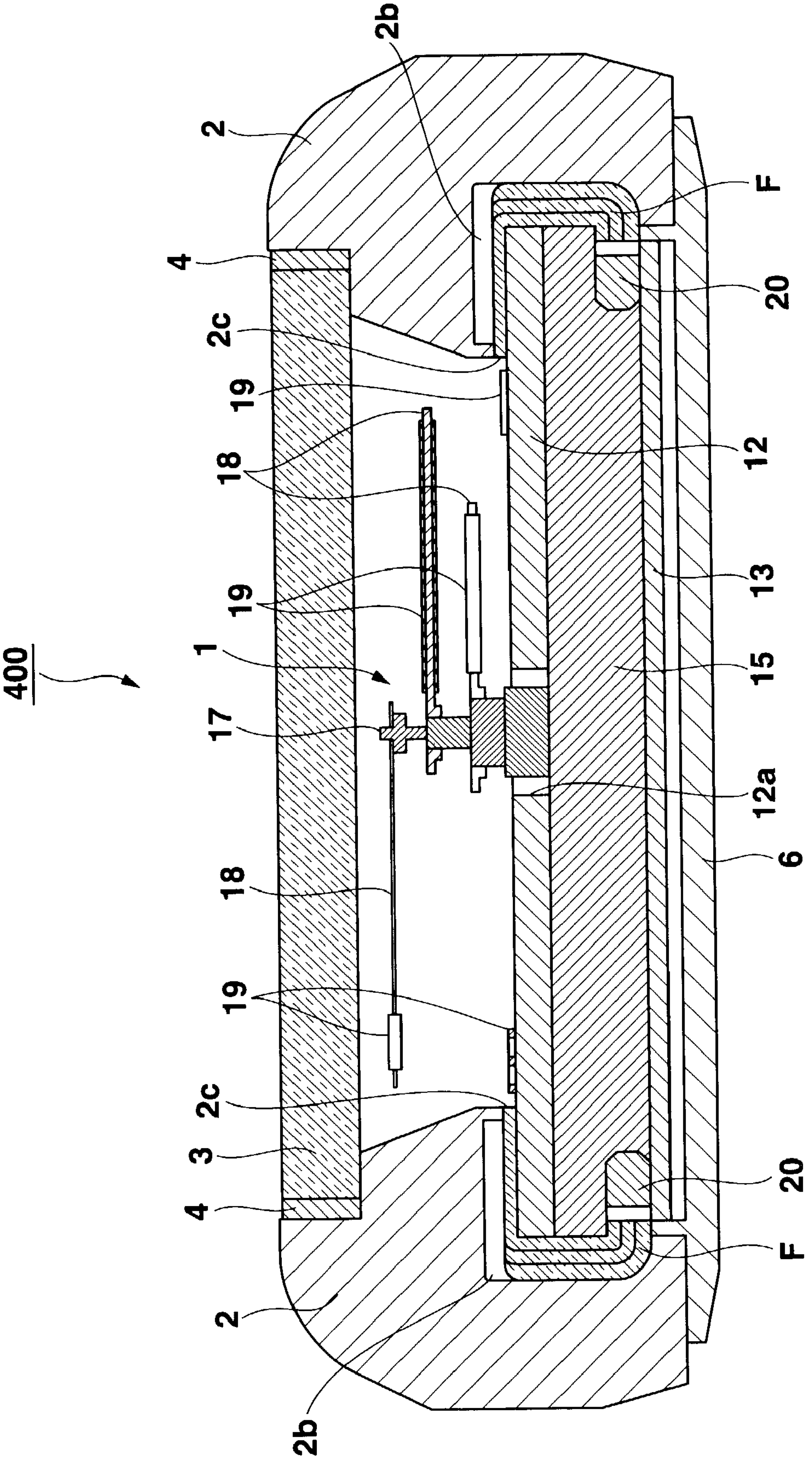
FIG. 36 is a sectional view showing the 11th embodiment of the wristwatch to which the present invention is applied.
Figure 37:
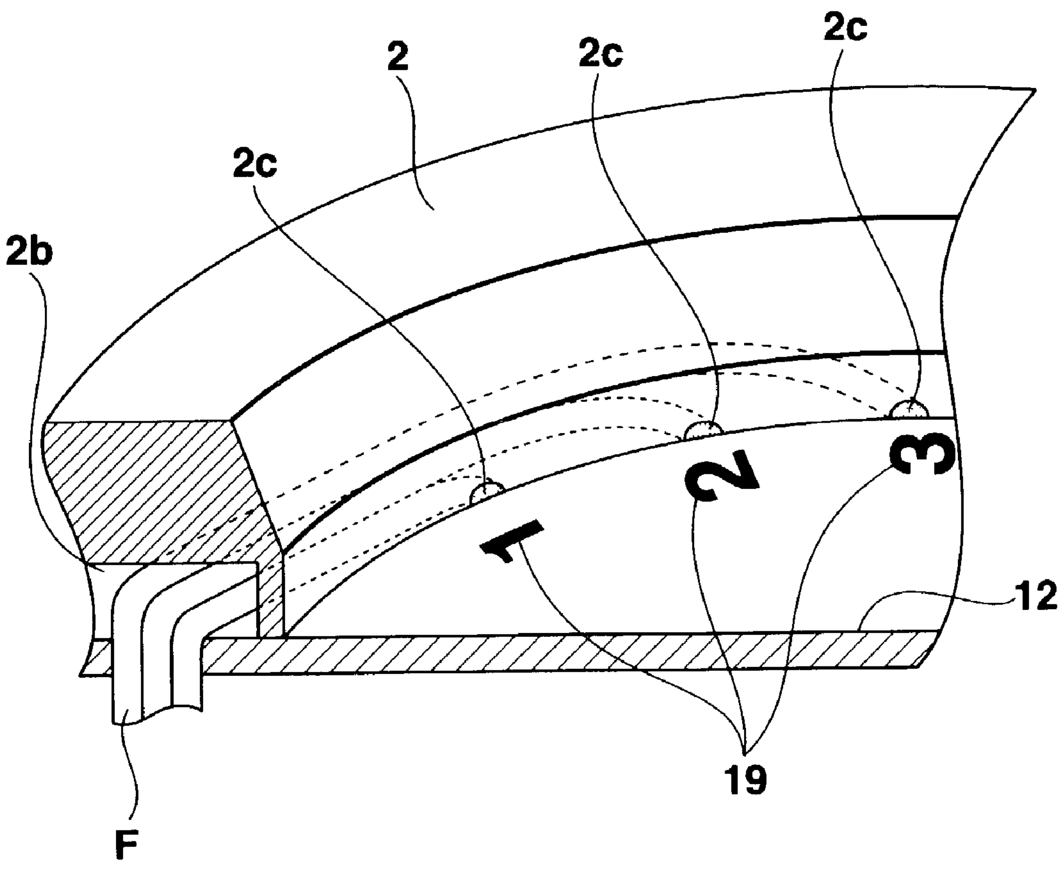
FIG. 37 is a partially sectional perspective view showing the arrangement of an optical fiber bundle in the 11th embodiment according to the present invention.

As shown in FIGS. 36 and 37, in a wristwatch 400 of this 11th embodiment, ultraviolet light-emitting elements 20 are arranged on a circuit board 13 in an analog hand mechanism 15 below a dial 12. One end of a bundle F of optical fibers having the same diameter as light guide members opposes the front surface of a light output portion 20*a* of each ultraviolet light-emitting element 20. This optical fiber bundle F extends to the upper surface of the dial 12 through an internal trench 2*b* of a watch case 2. The other end of this optical fiber bundle F is evenly separated and distributed to individual hour numerals and directed to light-emitting portions 19 on these hour numerals from light output holes 2*c* in the watch case 2.

That is, output ultraviolet rays from each ultraviolet light-emitting element 20 are fed into one end of the optical fiber bundle F, guided by this optical fiber bundle F, and radiated substantially evenly from the other end of the optical fiber bundle F toward the light-emitting portions 19 on the hour numerals. This allows the light-emitting portions 19 formed on the hour numerals from 1 to 12 o'clock of the dial 12 to emit light of substantially the same level.

As described above, regardless of the position of the ultraviolet light-emitting element 20, ultraviolet rays can be guided and radiated to desired portions by using the optical fiber bundle F or the like, thereby making the light-emitting portions 19 formed in these desired portions emit light. Furthermore, since the output ultraviolet rays from the ultraviolet light-emitting element 20 are evenly separated and guided, the light-emitting portions 19 can emit light of the same level.

In the first to sixth embodiments described earlier, the serrations 5*a* are formed on the inner circumferential surface of the frame-like member 5. However, the present invention is not restricted to these embodiments. For example, these serrations 5*a* can also be formed on the outer circumferential surface. That is, the serrations 5*a* can be formed in any portion as long as the same function and effect are obtained.

In the seventh embodiment, the serrations 5*a* are not formed in portions corresponding to 12 and 6 o'clock in which the ultraviolet light-emitting elements 20 are formed, and are formed in portions corresponding to slightly separated hour numerals. However, the serrations 5*a* can also be formed in the portions corresponding to 12 and 6 o'clock in which the ultraviolet light-emitting elements 20 are formed.

Also, any number of light-emitting elements can be formed in any arbitrary position.

These light-emitting elements can emit light at any arbitrary timing with any given emission pattern.

The electronic apparatus is not limited to a wristwatch but could be another apparatus, such as a cell phone or automobile meter.

Furthermore, the frame-like member can take any given shape. It is, of course, also possible to appropriately change other structures, etc.

In the first embodiment, output light from the light-emitting elements formed in the frame-like member having light transmitting properties is fed into the frame-like member, and this light can be diverged or converged and radiated toward the light-emitting portions by the light-radiating portions. Therefore, the light can be efficiently radiated from the light-radiating portions toward the light-emitting portions. Also, since the diverged or converged light allows the light-emitting portions to emit colored light, highly decorative light emission display can be performed.

In the eighth and 11th embodiments, output light from the light-emitting elements is separated and guided by a plurality of light guide portions, and the guided light can be radiated from the end portions of these light guide portions toward the light-emitting portions. Hence, the light an be effectively radiated toward a plurality of light-emitting portions. Additionally, since the radiated light permits these light-emitting portions to emit colored light, highly decorative light emission display can be performed.

In the ninth embodiment, the amounts of photoreactive light-emitting particles in the light-emitting portions which emit colored light in response to output light from the light-emitting elements formed in the light-transmitting, frame-like member are changed in accordance with the distances from the light-emitting elements. Accordingly, the emission amounts of the light-emitting portions can be adjusted in accordance with the distances from the light-emitting elements. Therefore, even when the distances from the light-emitting elements and the amounts of light irradiating the light-emitting portions are different, the emission amounts of these light-emitting portions can be made substantially constant.

Also, the radiated light allows the light-emitting portions to emit colored light, so highly decorative light emission display can be performed.

In the 10th embodiment, the light-shielding areas of the light-shielding members for shielding light radiated toward the light-emitting portions which emit colored light in response to output light from the light-emitting elements formed in the light-transmitting, frame-like member are changed in accordance with the distances from the light-emitting elements. Accordingly, the emission amounts of the light-emitting portions can be adjusted in accordance with the distances from the light-emitting elements. Therefore, even when the distances from the light-emitting elements and the amounts of light irradiating the light-emitting portions are different, the emission amounts of these light-emitting portions can be made substantially constant.

Also, the radiated light allows the light-emitting portions to emit colored light, so highly decorative light emission display can be performed.

In the seventh embodiment, the light-radiating portions are formed in predetermined portions of the frame-like member or throughout the entire circumference of the frame-like member in accordance with the arrangement of the light-emitting portions. This allows the light-emitting portions to emit light more efficiently.

In the seventh embodiment, the light-radiating portions different in size are formed in a plurality of portions of the frame-like member, so desired portions can be irradiated with large amounts of light. Consequently, more entertaining light emission display can be performed.

In the seventh embodiment, the light-radiating portions having different sizes corresponding to the distances from the light-emitting elements are formed in a plurality of portions of the frame-like member. Therefore, even the light-radiating portions at different distances from the light-emitting elements can radiate a substantially constant amount of light.

In the seventh embodiment, the light-radiating portions are formed in one or a plurality of portions of the frame-like member such that the number or size of serrations changes in accordance with the distance from the light-emitting element. Hence, even the light-radiating portions at different distances from the light-emitting elements can radiate a substantially constant amount of light.

In the seventh embodiment, each light-radiating portion is formed into a lens-like shape. Divergent or convergent light unique to the lens can irradiate a target light-emitting portion like spotlight. Consequently, more unique and entertaining light emission can be performed.

In the first and seventh embodiments, the light-radiating portions are formed on the inner circumferential surface and/or the outer circumferential surface of the frame-like member. Accordingly, the light-emitting portions can emit light more efficiently.

In the eighth embodiment, the light guide members can efficiently take in output light from the light-emitting elements. So, the light-emitting portions can be efficiently irradiated with the light.

Also, the light guide members can be reinforced by the reinforcing members, and the inner surfaces of these reinforcing members are leveled with the end portions of the light guide members. This gives a clear-cut outer appearance to the inner circumferential surfaces of the reinforcing members and the light guide members.

In the 11th embodiment, the light guide members are made up of optical fibers. This increases the degree of freedom of the arrangement of the light-emitting elements, and thereby facilitates incorporating these light-emitting elements. In addition, the light-emitting portions can be irradiated, without any loss, with output light from the light-emitting elements in various forms by the optical fibers. This realizes more unique and entertaining light emission.

In the sixth embodiment, a plurality of light-emitting elements can emit light at different emission timings under the control of the emission control means. Therefore, various light emission expressions such as on-and-off emission of the light-emitting portions can be made. Consequently, more decorative and entertaining light emission can be performed.

From the above-mentioned embodiments, the present invention can make various light emission expressions by emitting light from predetermined characters, numerals, figures, and symbols formed in the light-emitting portions. This increases the decorativeness.

Also, the light-emitting element is one of an ultraviolet light-emitting element, visible light-emitting element, and infrared light-emitting element. Therefore, more unique and entertaining light emission can be performed by selectively using these light-emitting elements by making the best use of their features in accordance with the purposes.

Furthermore, when a light-emitting display device including light-emitting elements and a frame-like member having light-radiating portions is placed in an apparatus case, various electronic apparatuses can be given a highly decorative and entertaining light emission display function.

What is claimed is:

1. A light-emitting display device using a light-emitting element, comprising:

a glass having light transmission characteristics;

a dial provided under the glass;

hour numerals provided at predetermined positions on an outer periphery of a surface of the dial;

a frame-like member provided between a peripheral portion of the dial and a peripheral portion of the glass;

an ultraviolet light-emitting element embedded in the frame-like member, and which emits ultraviolet rays;

a light-emitting portion formed of light-emitting particles for emitting colored light in response to the ultraviolet rays emitted by the ultraviolet light-emitting element provided in each of the hour numerals; and a serrated light-radiating portion formed on an entire circumferential peripheral portion of at least an inner peripheral portion or an outer peripheral portion of the frame-like member, and which radiates, when the ultraviolet rays emitted from the ultraviolet light-emitting element are incident on the frame-like member, the incident ultraviolet rays toward the light-emitting portion while diverging or converging the ultraviolet rays.

2. The light-emitting display device according to claim 1, wherein the light-radiating portion is formed on at least the inner peripheral portion or the outer peripheral portion of the frame-like member, and comprises a plurality, of convex and concave portions at positions corresponding to each of the hour numerals.

3. The light-emitting display device according to claim 1, wherein the light-radiating portion is formed on at least the inner peripheral portion or the outer peripheral portion of the frame-like member, and comprises convex and concave portions formed in a shape of a lens at positions corresponding to each of the hour numerals.

4. The light-emitting display device according to claim 1, wherein the light-radiating portion is formed at positions corresponding to each of the hour numerals on at least the inner peripheral portion or the outer peripheral portion of the frame-like member, and the number of convex and concave portions formed at positions corresponding to each of the hour numerals increases in a direction away from the ultraviolet light-emitting element.

5. The light-emitting display device according to claim 1, wherein the light-radiating portion is formed at positions corresponding to each of the hour numerals on at least the inner peripheral portion or the outer peripheral portion of the frame-like member, and sizes of the convex and concave portions increase in a direction away from the ultraviolet light-emitting element.

6. The light-emitting display device according to claim 1, wherein the light-emitting portion emits more light-emitting particles for emitting colored light in response to the ultraviolet rays emitted by the ultraviolet light-emitting element in a direction away from the ultraviolet light-emitting element.

7. An electronic device comprising:

an apparatus case including an opening portion;

a glass having light transmission characteristics and located in such a way as to cover the opening portion of the apparatus case;

a dial provided under the glass;

hour numerals provided at predetermined positions on an outer periphery of a surface of the dial:

a frame-like member provided between a peripheral portion of the dial and a peripheral portion of the glass, and which is fixed onto an inner circumferential peripheral surface of the apparatus case;

an ultraviolet light-emitting element embedded in the frame-like member, and which emits ultraviolet rays;

a light-emitting portion formed of light-emitting particles for emitting colored light in response to the ultraviolet rays emitted by the ultraviolet light-emitting element provided in each of the hour numerals; and a serrated light-radiating portion formed on an entire circumferential peripheral portion of at least an inner peripheral portion or an outer peripheral portion of the frame-like member, and which radiates, when the ultraviolet rays emitted from the ultraviolet light-emitting element are incident on the frame-like member, the incident ultraviolet rays toward the light-emitting portion while diverging or converging the ultraviolet rays.

8. The electronic device according to claim 7, wherein the light-radiating portion is formed on at least the inner peripheral portion or the outer peripheral portion of the frame-like member, and comprises a plurality of convex and concave portions at positions corresponding to each of the hour numerals.

9. The electronic device according to claim 7, wherein the light-radiating portion is formed on at least the inner peripheral portion or the outer peripheral portion of the frame-like member, and comprises convex and concave portions formed in a shape of a lens at positions corresponding to each of the hour numerals.

10. The electronic device according to claim 7, wherein the light-radiating portion is formed at positions corresponding to each of the hour numerals on at least the inner peripheral portion or the outer peripheral portion of the frame-like member, and the number of convex and concave portions formed at positions corresponding to each of the hour numerals increases in a direction away from the ultraviolet light-emitting element.

11. The electronic device according to claim 7, wherein the light-radiating portion is formed at positions corresponding to each of the hour numerals on at least the inner peripheral portion or the outer peripheral portion of the frame-like member, and sizes of the convex and concave portions increase in a direction away from the ultraviolet, light-emitting element.

12. The electronic device according to claim 7, wherein the light-emitting portion emits more light-emitting particles for emitting colored light in response to the ultraviolet rays emitted by the ultraviolet light-emitting element in a direction away from the ultraviolet light-emitting element.

* * * * *